(12) United States Patent
Koenig et al.

(10) Patent No.: US 10,457,480 B2
(45) Date of Patent: Oct. 29, 2019

(54) CANTILEVERED DUMPER SYSTEM

(71) Applicants: Mark E. Koenig, Pickerington, OH (US); Larry E. Koenig, Canal Winchester, OH (US)

(72) Inventors: Mark E. Koenig, Pickerington, OH (US); Larry E. Koenig, Canal Winchester, OH (US)

( * ) Notice: Subject to any disclaimer, the term of this patent is extended or adjusted under 35 U.S.C. 154(b) by 0 days.

(21) Appl. No.: 15/727,563

(22) Filed: Oct. 6, 2017

(65) Prior Publication Data
US 2018/0118459 A1   May 3, 2018

Related U.S. Application Data

(60) Provisional application No. 62/405,231, filed on Oct. 6, 2016.

(51) Int. Cl.
| | |
|---|---|
| *B65F 1/12* | (2006.01) |
| *B61D 3/18* | (2006.01) |
| *B65D 21/06* | (2006.01) |
| *B65F 3/04* | (2006.01) |
| *B66F 9/12* | (2006.01) |
| *B66F 9/19* | (2006.01) |
| *B65G 65/23* | (2006.01) |
| *B65F 3/02* | (2006.01) |

(52) U.S. Cl.
CPC .............. *B65F 1/122* (2013.01); *B61D 3/188* (2013.01); *B65D 21/066* (2013.01); *B65F 3/043* (2013.01); *B65F 3/046* (2013.01); *B65G 65/23* (2013.01); *B66F 9/125* (2013.01); *B66F 9/19* (2013.01); *B65F 2003/0269* (2013.01); *B65F 2003/0279* (2013.01)

(58) Field of Classification Search
CPC .......... B65F 1/122; B65F 3/043; B65F 3/046; B65F 9/125; B65G 65/23
See application file for complete search history.

(56) References Cited

U.S. PATENT DOCUMENTS

| | | | |
|---|---|---|---|
| 2,468,326 | A | 4/1949 | Gleason |
| 3,136,436 | A | 6/1964 | Erlinder et al. |
| 3,563,341 | A | 2/1971 | Bultman |
| 4,272,217 | A | 6/1981 | Sefcik |
| 4,540,330 | A | 9/1985 | Taylor |

(Continued)

*Primary Examiner* — Ronald P Jarrett
(74) *Attorney, Agent, or Firm* — Standley Law Group LLP; Jeffrey C. Norris; Eric M. Gayan

(57) ABSTRACT

A cantilevered dumping system comprising a dumping mechanism that is adapted to be repositioned (e.g., reversed) relative to a base structure such that there may be multiple modes of operation of the dumping mechanism relative to the base structure (e.g., loading of materials and/or movement of the dumping mechanism, etc.). An exemplary embodiment of a dumping system may allow for the connections of a dumping mechanism to a base structure to be changed (e.g., reversed) such that the operation of the dumping mechanism relative to the base structure (e.g., loading of materials and/or movement of the dumping mechanism, etc.) is different. Another embodiment of a dumping system may include a base structure that includes multiple guide plates and/or guide rails to facilitate the desired modes of operation of a dumping mechanism relative to the base structure (e.g., loading of materials and/or movement of the dumping mechanism, etc.).

20 Claims, 31 Drawing Sheets

(56) References Cited

U.S. PATENT DOCUMENTS

| | | | |
|---|---|---|---|
| 4,797,050 A * | 1/1989 | Habicht | B66F 9/19 |
| | | | 414/420 |
| 6,477,964 B1 | 11/2002 | Tygard | |
| 6,764,269 B1 | 7/2004 | Cannata | |
| 9,114,941 B1 * | 8/2015 | Fein | B65G 67/04 |
| 2006/0086264 A1 | 4/2006 | Brees | |

* cited by examiner

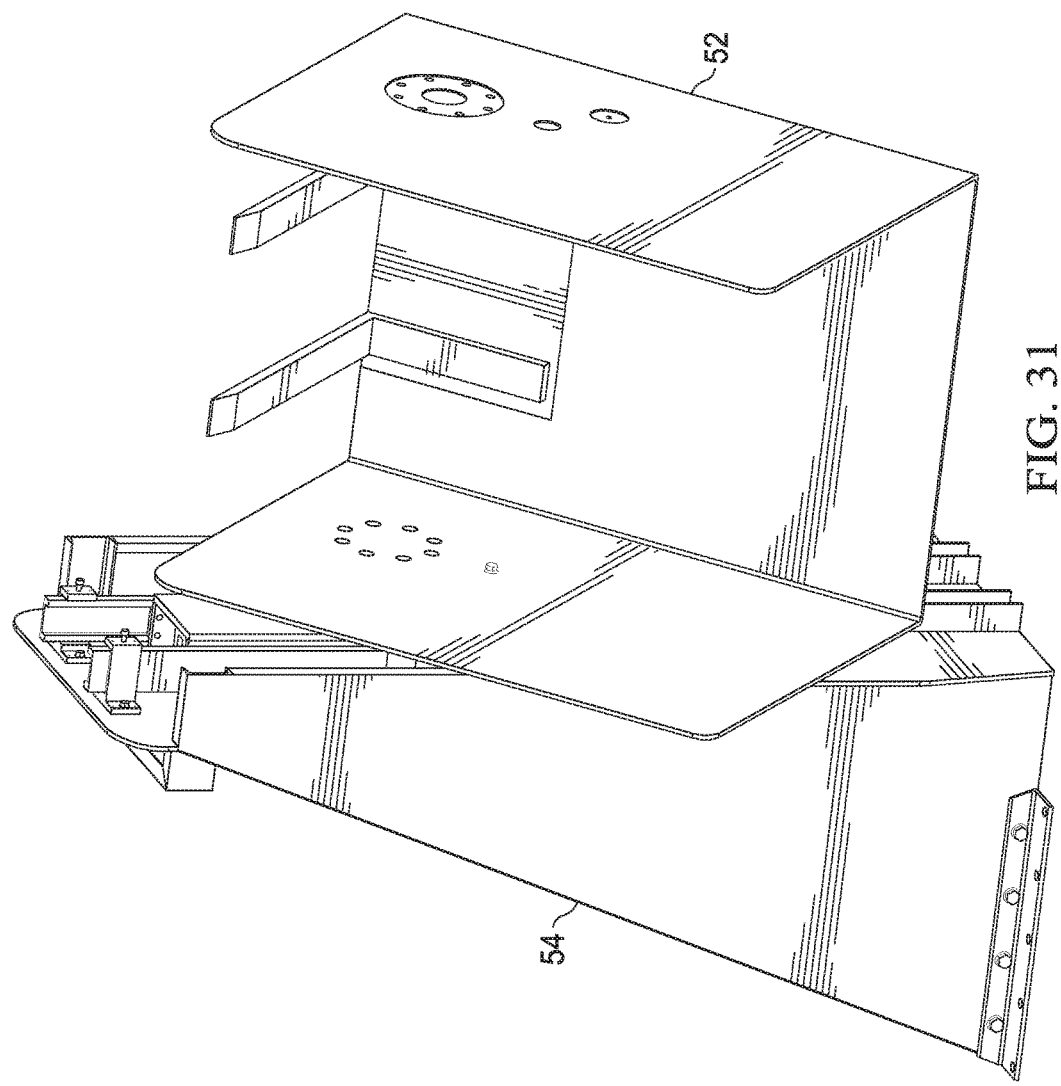

CANTILEVERED DUMPER SYSTEM

This application claims the benefit of U.S. Provisional Application No. 62/405,231, filed Oct. 6, 2016, which is hereby incorporated by reference in its entirety.

BACKGROUND AND SUMMARY OF THE INVENTION

Exemplary embodiments of the present invention relate generally to a dumping system. Dumping systems may be used for a variety of purposes. For instance, a dumping system may be used for dumping various types of goods, recycled or recycling materials, trash and other types of waste, etc. Unless otherwise expressly set forth, an exemplary embodiment of the present invention is not limited to use for any particular type of materials to be dumped.

A shortcoming of a known dumping system is that it is only configured to dump in a single predetermined direction relative to a base structure (e.g., a support frame) to which the dumping mechanism is mounted. In other words, a known dumping system may only be configured to move in one pattern relative to a base structure to which the dumping mechanism is mounted in order to dump material. A similar shortcoming may also exist with respect to loading material into a known dumping system to be dumped. In particular, a known dumping system may only be configured to receive materials in a certain direction. In other words, a known dumping may have a set configuration that requires material to be loaded into the dumping system in a certain direction.

As a result of such limitations, a known dumping system may not suitable for use in certain locations or environments. For instance, a known dumping system is positioned adjacent to dumpster (e.g., a roll-off dumpster, a permanent or stationary dumpster, or any other suitable type of dumpster), a collection bin, or any other suitable type of device for receiving the dumped materials. For ease of description, each such device for receiving the dumped materials will hereafter be referred to as a dumpster. In light of this layout, a known dumping system having the aforementioned shortcomings must be positioned in a certain way such that the dumping operation is not impeded by the dumpster and the material is properly dumped into the dumpster. The dumping system having the aforementioned shortcomings will not be useful in a particular location or environment if it cannot be positioned in that necessary way. For example, some locations or environments may not have sufficient room for the base structure of the dumping system in order to allow for it to be positioned in the necessary way. The aforementioned shortcomings therefore limit the usefulness and versatility of a known dumping system.

In light of the aforementioned shortcomings, there is therefore a need for a dumping system that is adapted to be reconfigured for different types of environments or locations. There is also a need for a dumping system that may be configured to be able to dump in multiple different directions relative to a base structure (e.g., a support frame) to which the dumping mechanism is mounted. Similarly, there is a need for a dumping system that may be configured to be able to move in multiple different patterns relative to a base structure to which the dumping mechanism is mounted in order to dump material. A further need exists for a dumping system that may be configured to be able to receive materials in multiple different directions and/or that allows for multiple different configurations such that material to be dumped may be loaded from different directions. Finally, there is a need for a dumping system that allows for the connections of a carriage to a base structure to be changed (e.g., reversed) such that the operation of the carriage relative to the base structure (e.g., loading of materials and/or movement of carriage, etc.) is different.

An exemplary embodiment of the present invention may satisfy one or more of the above needs. For example, an embodiment of a dumping system may include a dumping mechanism (e.g., a carriage) that is adapted to be repositioned (e.g., reversed) relative to a base structure (e.g., a support frame) such that operation of the dumping mechanism relative to the base structure (e.g., loading of materials and/or movement of carriage, etc.) is different. For example, an embodiment of a dumping system may allow for the connections of a dumping mechanism to a base structure to be changed (e.g., reversed) such that the operation of the dumping mechanism relative to the base structure (e.g., loading of materials and/or movement of carriage, etc.) is different. Another embodiment of a dumping system may include a base structure (e.g., a support frame) that includes multiple guide plates and/or guide rails to facilitate the desired operation of a dumping mechanism (e.g., a carriage) relative to the base structure (e.g., loading of materials and/or movement of carriage, etc.). In light of at least one and, more preferably, a combination of such features, an exemplary embodiment may be adapted to be reconfigured for different types of environments or locations; may be configured to be able to dump in multiple different directions relative to a base structure to which the dumping mechanism is mounted; may be configured to be able to move in multiple different patterns relative to a base structure to which the dumping mechanism is mounted in order to dump material; may be configured to be able to receive materials in multiple different directions; and/or may be configured to allow for multiple different configurations such that material to be dumped may be loaded from different directions.

In addition to the novel features and advantages mentioned above, other benefits will be readily apparent from the following descriptions of the drawings and exemplary embodiments.

BRIEF DESCRIPTION OF THE DRAWINGS

FIG. 31 is a perspective view of the dumping system of FIG. 30, which corresponds to the fully extended position of the carriage shown in FIG. 30.

DETAILED DESCRIPTION OF EXEMPLARY EMBODIMENT(S)

Figure 1:
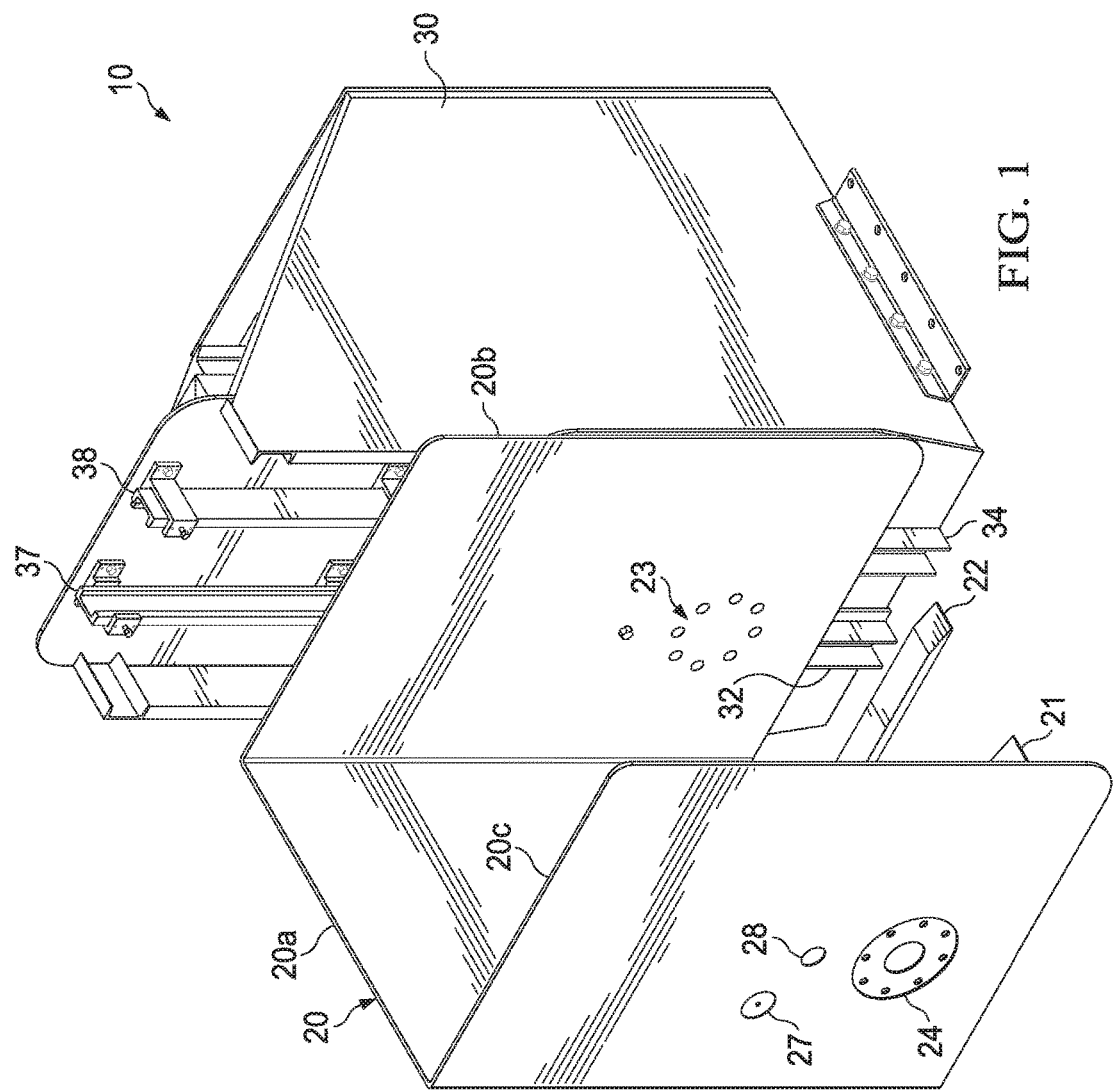
FIG. 1 is a perspective view of an exemplary embodiment of a dumping system of the present invention, which shows an exemplary embodiment of a carriage in a fully retracted position, wherein the carriage is adapted to operate in association with a right side of an exemplary embodiment of a base structure (when looking from the base structure toward the carriage) in order to dump material.
Figure 2:
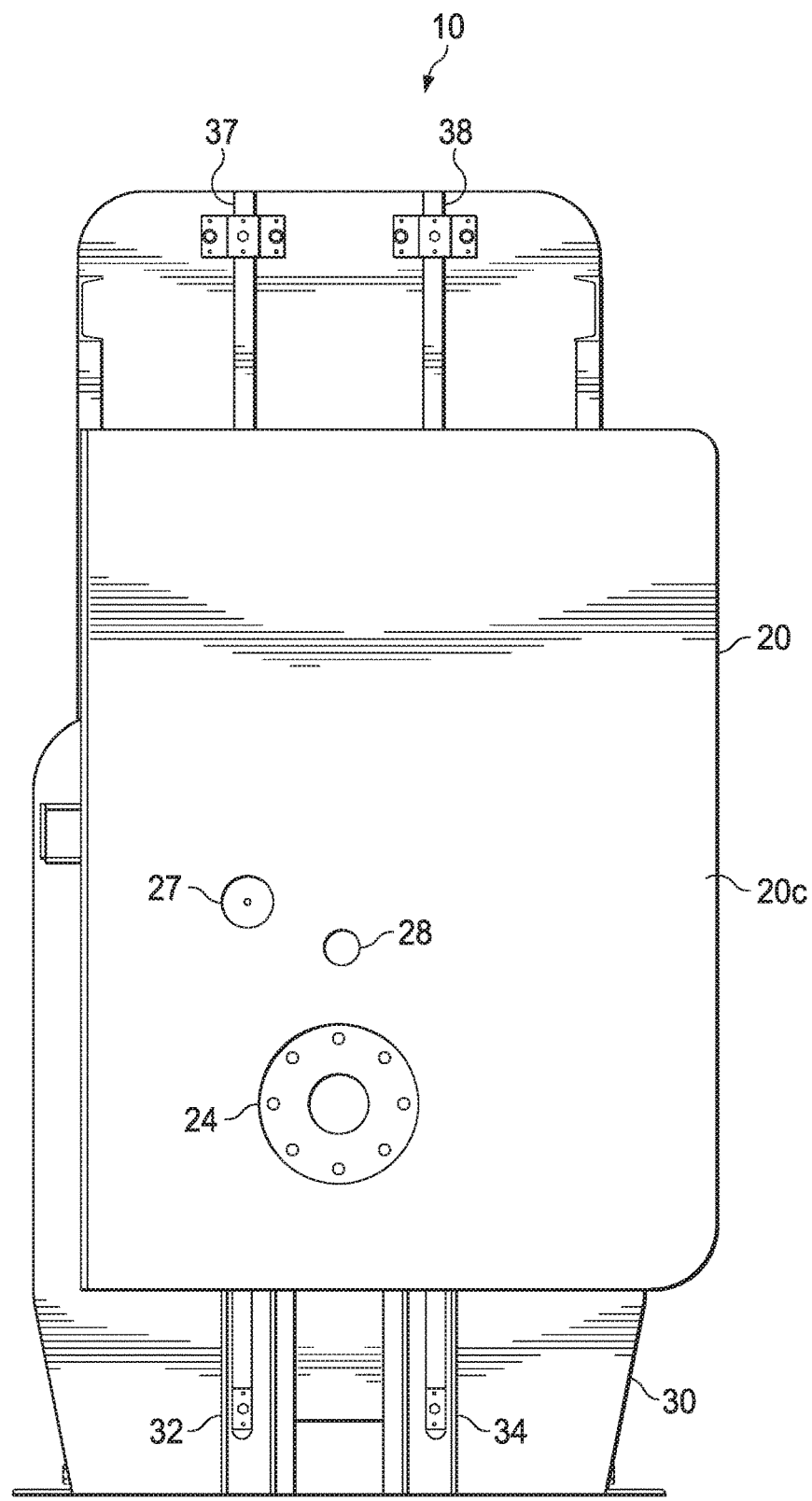
FIG. 2 is a front elevation view of the dumping system of FIG. 1, which corresponds to the fully retracted position of the carriage shown in FIG. 1.
Figure 3:
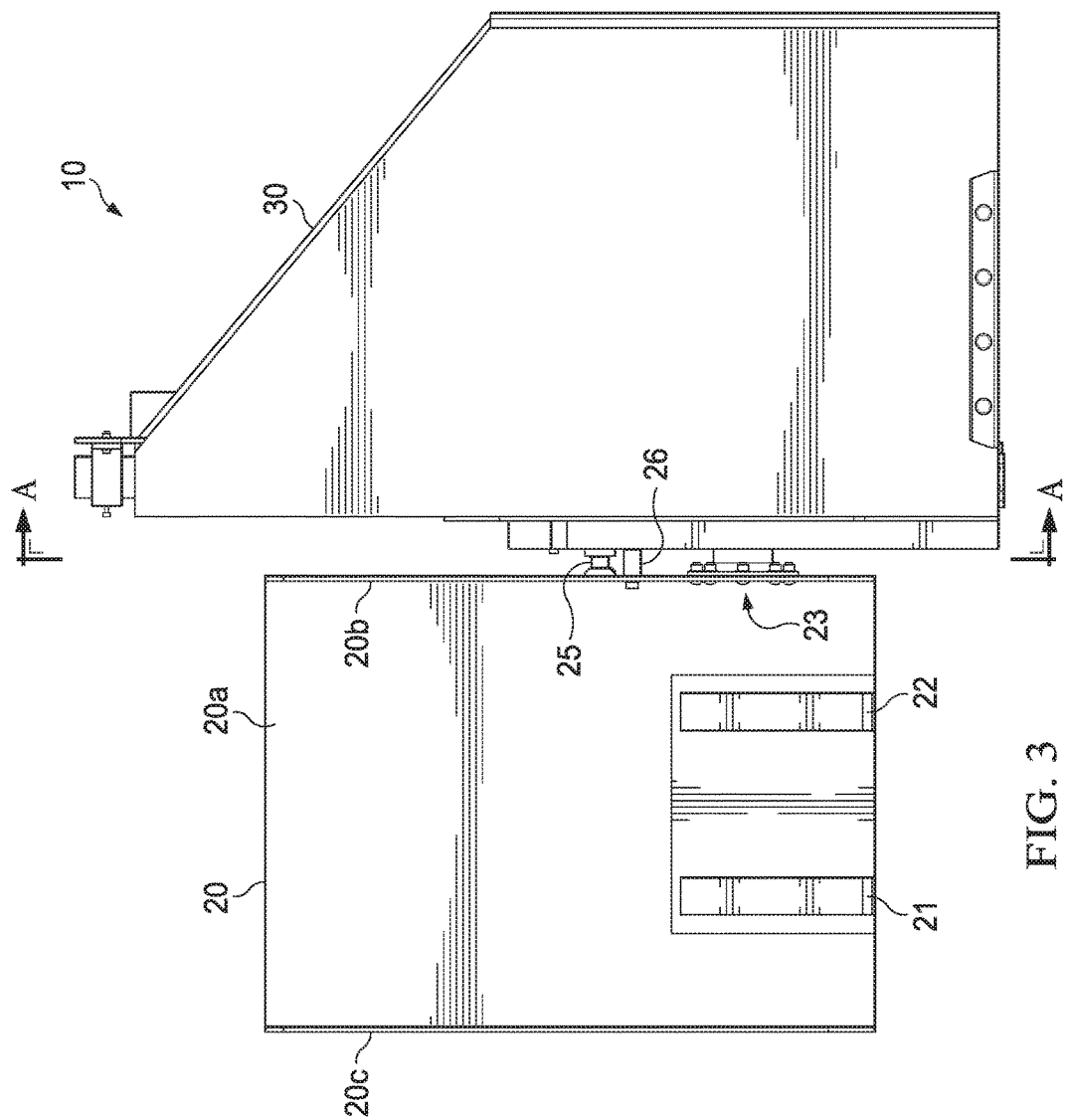
FIG. 3 is a first side elevation view of the dumping system of FIG. 1, which corresponds to the fully retracted position of the carriage shown in FIG. 1.

Exemplary embodiments of the present invention are directed to a dumping system. FIGS. 1-25 show various views of a first exemplary embodiment of a dumping system 10. Dumping system 10 comprises a dumping mechanism 20 that is connected to base structure 30, whereby dumping mechanism 20 is adapted to operate in association with base structure 30 in order to receive and then dump materials in a desired direction.

Dumping mechanism 20 may be adapted to receive material to be dumped in any suitable manner. In this exemplary embodiment, dumping mechanism 20 is adapted to receive material via an automated delivery system. In particular, this exemplary embodiment is adapted to receive materials that are delivered by a robot (e.g., a Kiva or Amazon robot, which may be commercially available). In other embodiments, material may be delivered to dumping mechanism 20 by other suitable automated means (e.g., forklift, etc.), manual means, or any other suitable means. Furthermore, the material to be dumped may be in any suitable form. For example, the material to be dumped may be contained in any suitable type of container or any other suitable holding, carrying, or transport mechanism (e.g., a box, a bag, a crate, a package, etc.). As another example, the material to be dumped may be loose material. Unless expressly set forth otherwise, it is not intended to limit the form of the material to be dumped.

An exemplary embodiment of a dumping mechanism 20 may also be known as a carriage or may include a carriage. In this example, carriage 20 is comprised of three sidewalls 20a, 20b, and 20c, which are arranged in a U-shape. The open area between the sidewalls 20a, 20b, and 20c is particularly useful for facilitating the loading and dumping of the material. Nevertheless, other exemplary embodiments of a carriage may be comprised of fewer or additional sidewalls and/or the sidewall(s) may be arranged in a different shape. In this exemplary embodiment, at least one prong extends from sidewall 20a to facilitate the reception of material from a robot. More particularly, prong 21 and prong 22 extend from sidewall 20a to facilitate the reception of material. Other exemplary embodiments may include additional prongs and/or the prong(s) may extend from any sidewall(s) to facilitate the reception and/or dumping of material. As another example, some embodiments may not include at least one prong. For example, one exemplary embodiment of a carriage may have a panel bottom (e.g., a panel that is connected to any or all of sidewalls 20a, 20b, and 20c). Other configurations are possible. Unless expressly set forth otherwise, a carriage may have any suitable shape and configuration that facilitates the loading and/or dumping of material.

Such as shown in FIG. 1, an exemplary embodiment of carriage 20 may be adapted to be repositioned (e.g., reversed) relative to a base structure 30 such that the operation of carriage 20 relative to the base structure 30 (e.g., loading of materials and/or movement of carriage 20, etc.) is different (e.g., reversed). In this example, carriage 20 comprises multiple possible mounting locations for facilitating connection to a drive system of base structure 30. In particular, carriage 20 is connected to a drive system of base structure 30 at mounting location 23 in the configuration of FIG. 1, which facilitates the reception of materials from a certain direction and the dumping of such materials in a certain direction relative to base structure 30. Dumping system 10 may be reconfigured such that carriage 20 is connected to the drive system of base structure 30 at mounting location 24, which facilitates the reception and dumping of materials in different (e.g., reversed) directions relative to the configuration shown in FIG. 1.

An exemplary embodiment of carriage 20 may also include at least one cam follower and at least one toggle bar to facilitate movement of carriage 20 relative to base structure 30. In particular, this embodiment of carriage 20 includes a cam follower 25 and a toggle bar 26. In an alternative configuration where the carriage 20 is connected to base structure 30 at mounting location 24, a cam follower may be positioned at location 27, and a toggle bar may be positioned at location 28.

In the exemplary embodiment of FIG. 1, mounting location 23, cam follower 25, and toggle bar 26 are centrally located (i.e., away from the edges of the sidewall 20b) on a lower half portion of sidewall 20b of carriage 20. Similarly, mounting location 24, cam follower location 27, and toggle bar location 28 are centrally located (i.e., away from the edges of opposite sidewall 20c) on a lower half portion of sidewall 20c of carriage 20. The aforementioned locations are particularly useful to facilitate the ability to reconfigure the dumping system 10 as set forth herein. However, other exemplary embodiments may utilize other locations on a carriage to obtain one or more advantages as set forth herein.

In the exemplary embodiment of FIG. 1, base structure 30 may facilitate the desired movement of carriage 20. In this example, cam follower 25 is adapted to travel along guide rail 32 in order to assist with directing the movement of carriage 20. In an alternative configuration where the carriage 20 is connected to base structure 30 at mounting location 24, a cam follower at location 27 is adapted to travel along guide rail 34 in order to assist with directing the movement of carriage 20. For example, cam follower 25 and toggle bar 26 are removable and repositionable to locations 27 and 28, respectively, to enable reconfiguration of carriage 20 at mounting location 24. In another exemplary embodiment, cam follower 25 and/or toggle bar 26 may be fixed in location, and there may be another cam follower and/or toggle bar fixed in location 27 and/or 28, respectively. Other variations are also possible for the positioning of a cam follower and toggle bar.

In this exemplary embodiment, each guide rail has an L-shape. In particular, such as shown in FIGS. 4, 7, 11, 12, 16, and 17, guide rail 32 is comprised of a substantially vertical portion 32a and a substantially horizontal portion 32b, and guide rail 34 is comprised of a substantially vertical portion 34a and a substantially horizontal portion 34b. In order to facilitate multiple configurations in this exemplary embodiment, substantially horizontal portions 32b and 34b extend in opposite directions away from their respective substantially vertical portions 32a and 34a. Other guide rail configurations are also possible. For example, each guide rail may have a more rounded curve, etc. To accommodate different guide rail configurations, the respective positions of a cam follower and toggle bar may be selected to achieve the desired movement along the guide rail. In fact, some guide rail configurations may not require a toggle bar.

In this example, each guide rail is positioned on a respective guide plate of base 30. Specifically, again with reference to FIGS. 4, 7, 11, 12, 16, and 17, guide rail 32 is positioned on a guide plate 33, and guide rail 34 is positioned on a guide plate 35. In this embodiment, a gap is provided between guide plate 33 and guide plate 35 to facilitate movement of carriage 20 along a guide rail. However, other embodiments may allow for guide plate 33 to be connected to guide plate 35, or may allow for another support configuration that enables the desired movement as set forth herein.

In this exemplary embodiment, the base structure 30 includes a bearing guide plate 36 to which carriage 20 is mounted. In particular, the bearing guide plate 36 is positioned adjacent or in the gap 36a between guide plate 33 and guide plate 35 such that it may facilitate movement of the carriage 20 along the gap 36a. More specifically, bearing guide plate 36 is connected to a drive system 40 that is adapted to raise and lower bearing guide plate 36 along at least one rail (e.g., rail 37 and rail 38) of base structure 30 in order to facilitate travel of carriage 20 along the guide rail. Such as shown in FIGS. 4, 7, 11, 12, 16, and 17, the drive system 40 may include a bearing assembly 42 that is connected or extends through bearing guide plate 36 to facilitate mounting and engagement of carriage 20 at mounting location 23 or 24. As a result, carriage 20 is cantilevered to base structure 30 in an exemplary embodiment. As the drive system 40 raises or lowers bearing guide plate 36, bearing assembly 42 enables rotation of carriage 20 such that carriage 20 may travel along a guide rail back and forth between a dumping position (i.e., a fully extended position) and a loading position (i.e., a fully retracted position).

Figure 4:
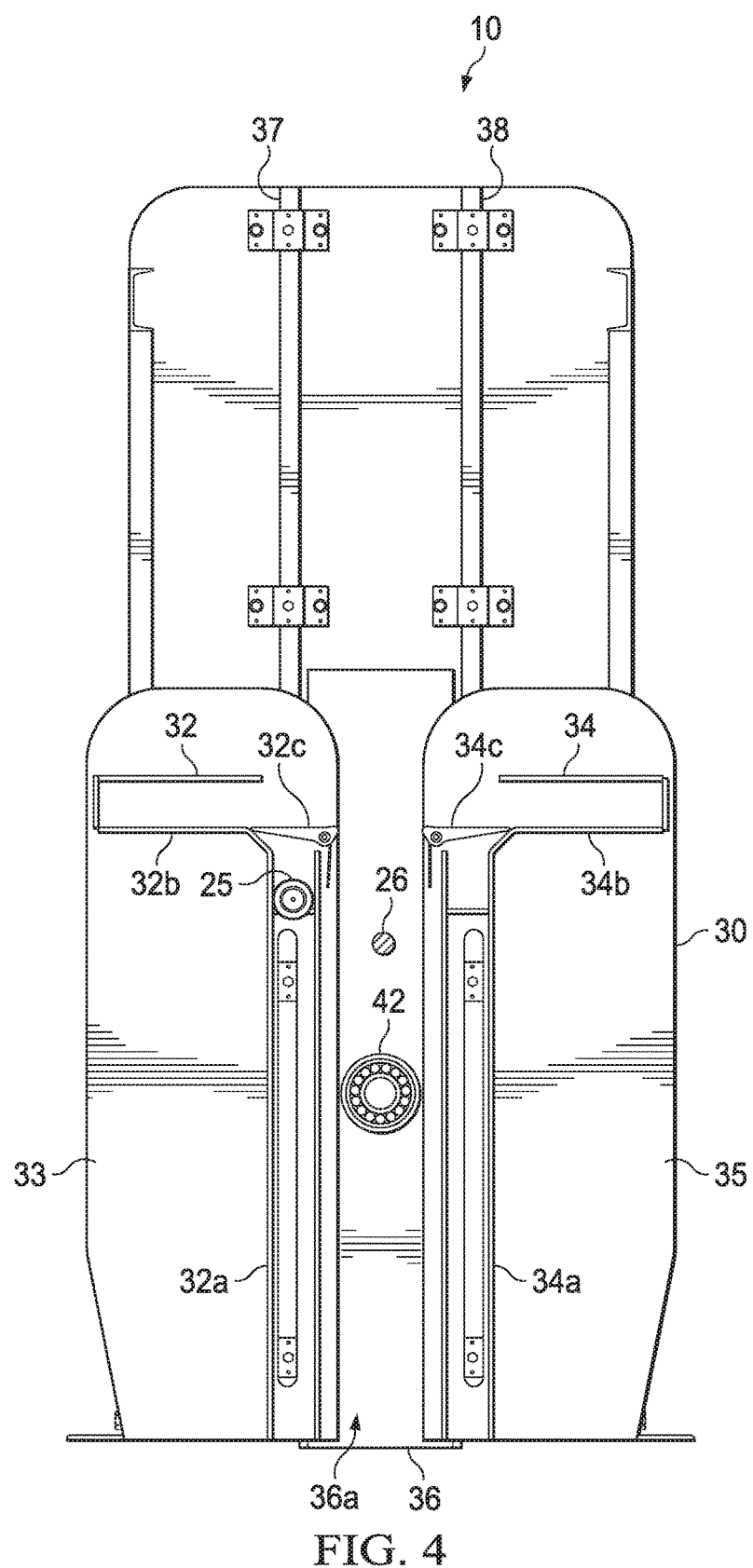
FIG. 4 is a cross-sectional view taken along line A-A of FIG. 3.
Figure 5:
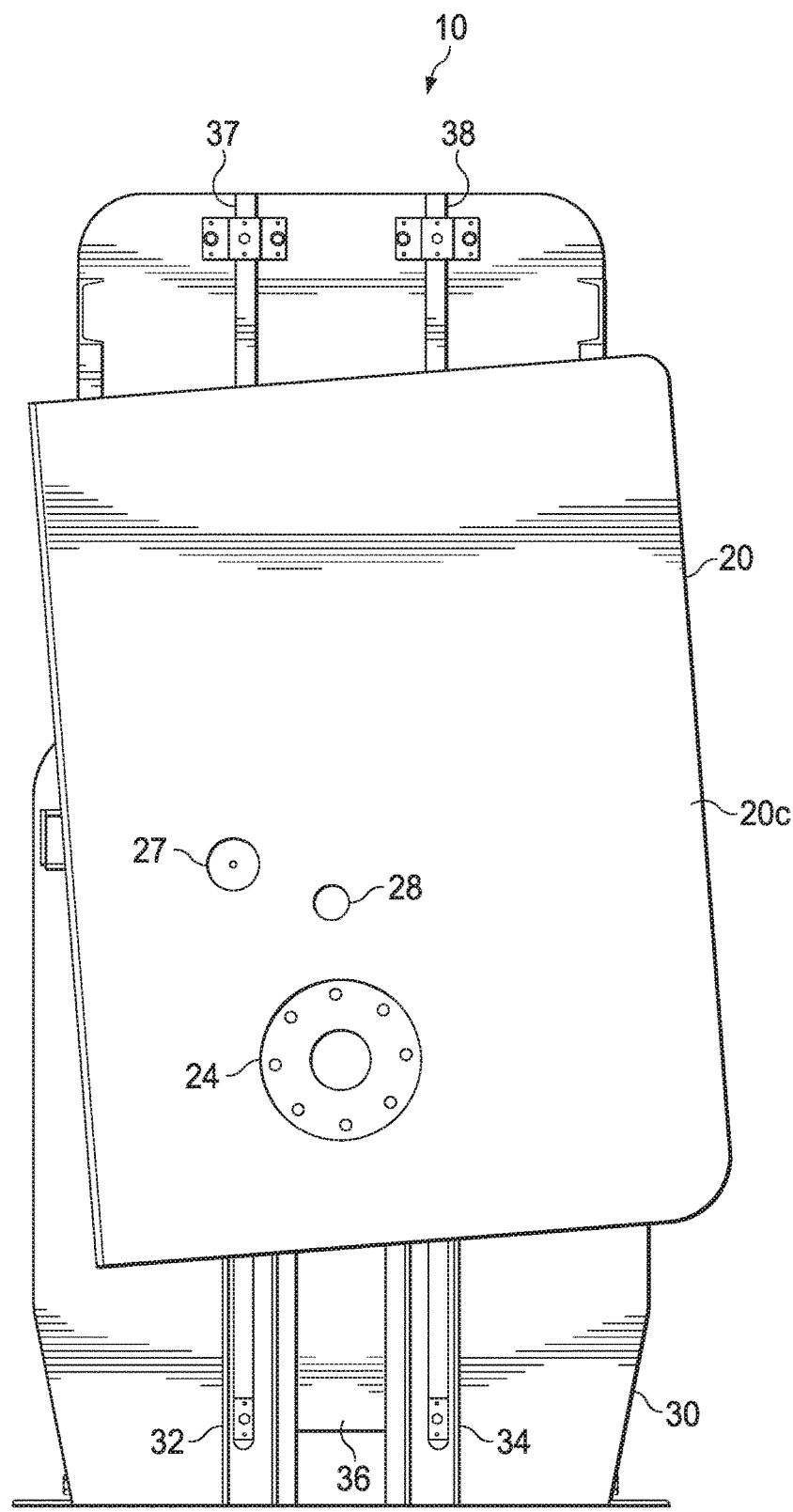
FIG. 5 is a front elevation view of the dumping system of FIG. 1, which shows the carriage in a partially extended position.
Figure 6:
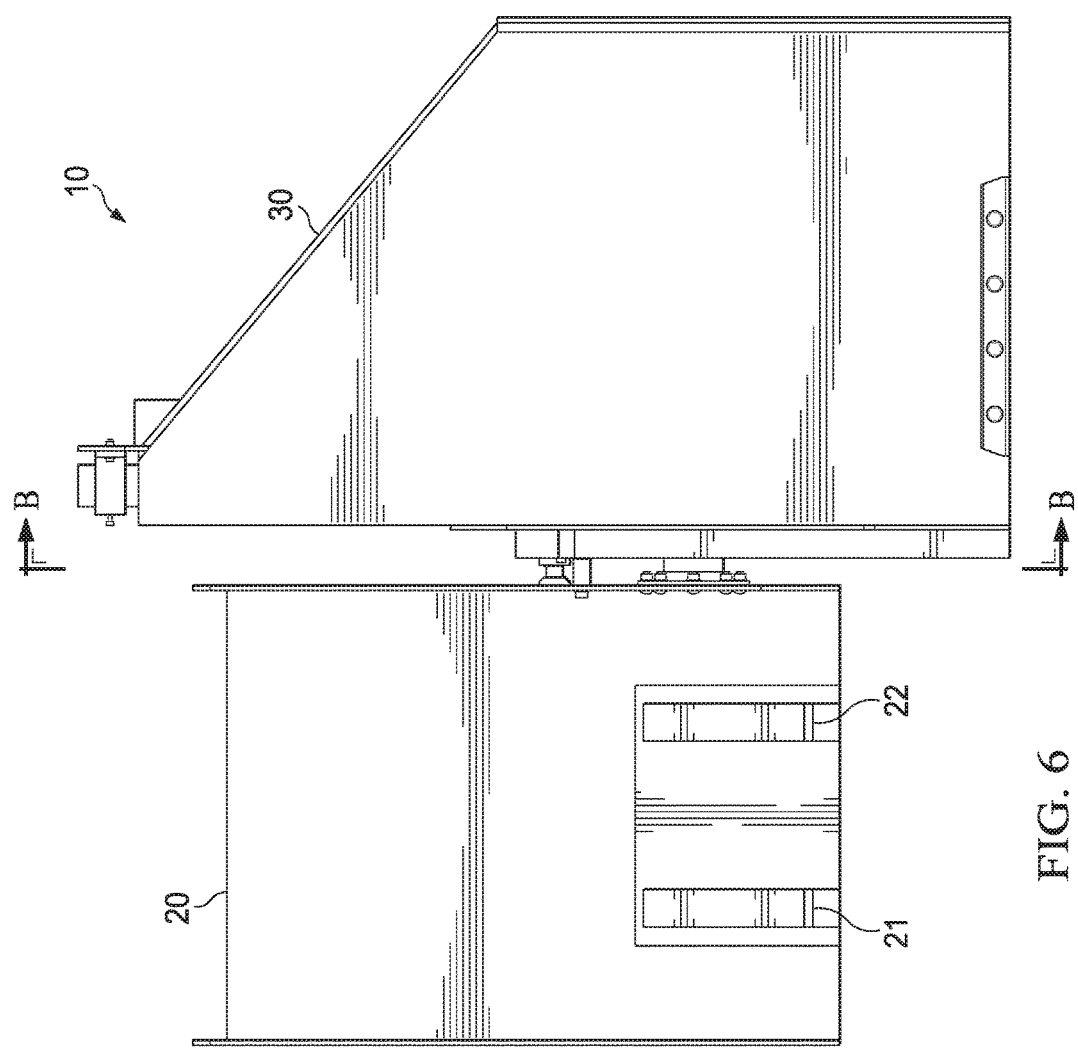
FIG. 6 is a side elevation view of the dumping system of FIG. 1, which corresponds to the partially extended position of the carriage shown in FIG. 5.
Figure 7:
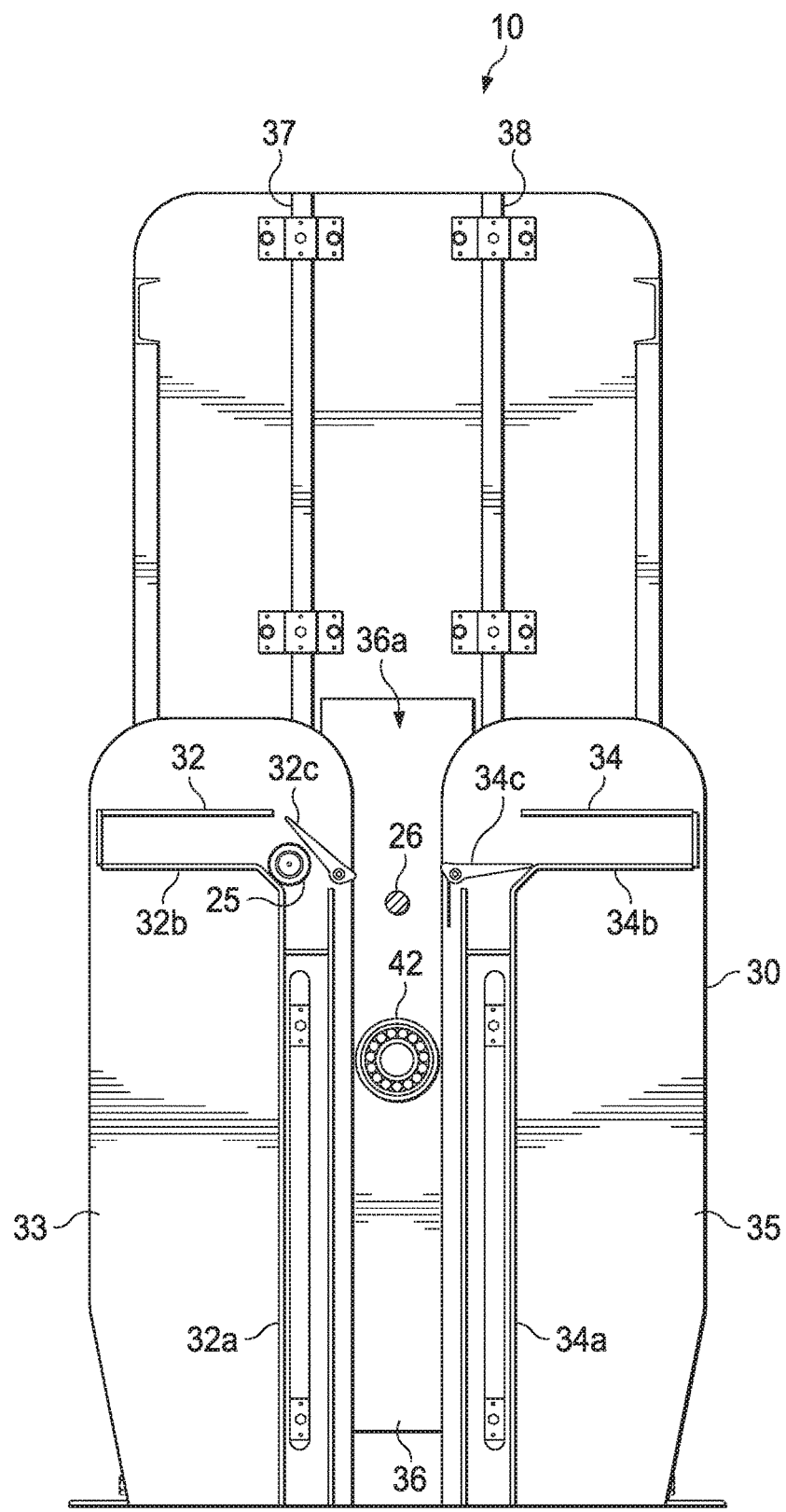
FIG. 7 is a cross-sectional view taken along line B-B of FIG. 6.
Figure 8:
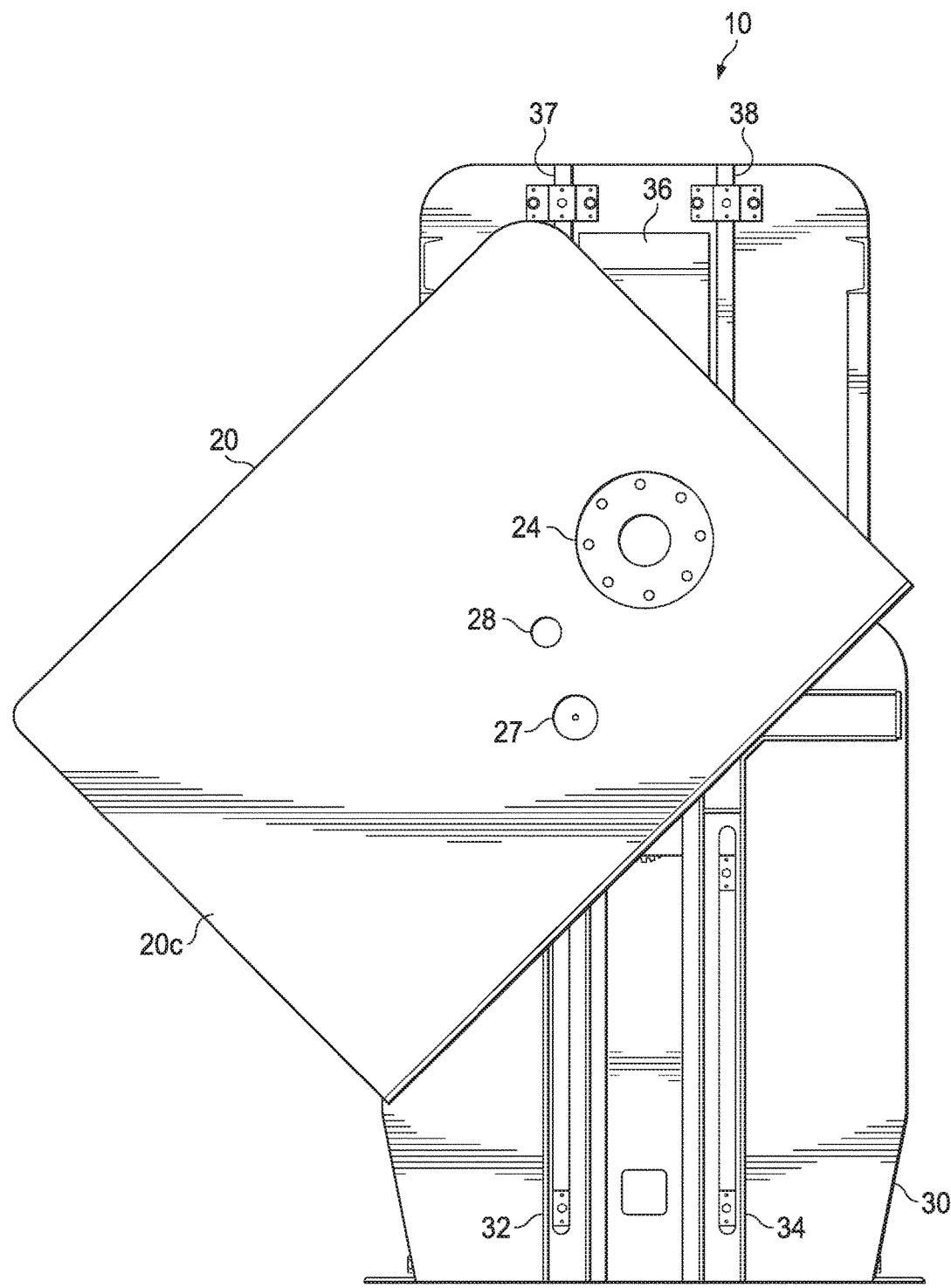
FIG. 8 is a front elevation view of the dumping system of FIG. 1, which shows the carriage in a fully extended position.
Figure 9:
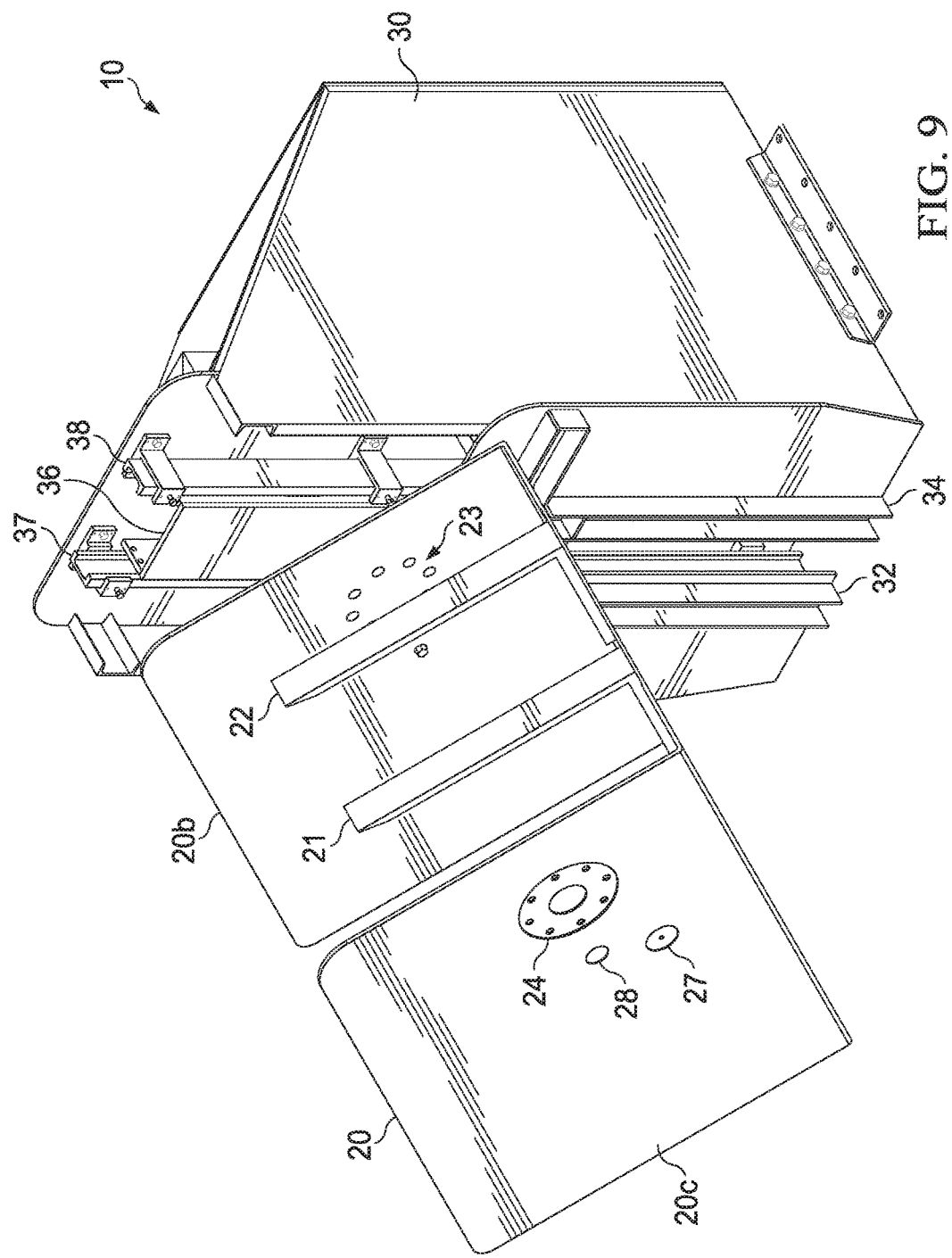
FIG. 9 is a perspective view of the dumping system of FIG. 1, which corresponds to the fully extended position of the carriage shown in FIG. 8.
Figure 10:
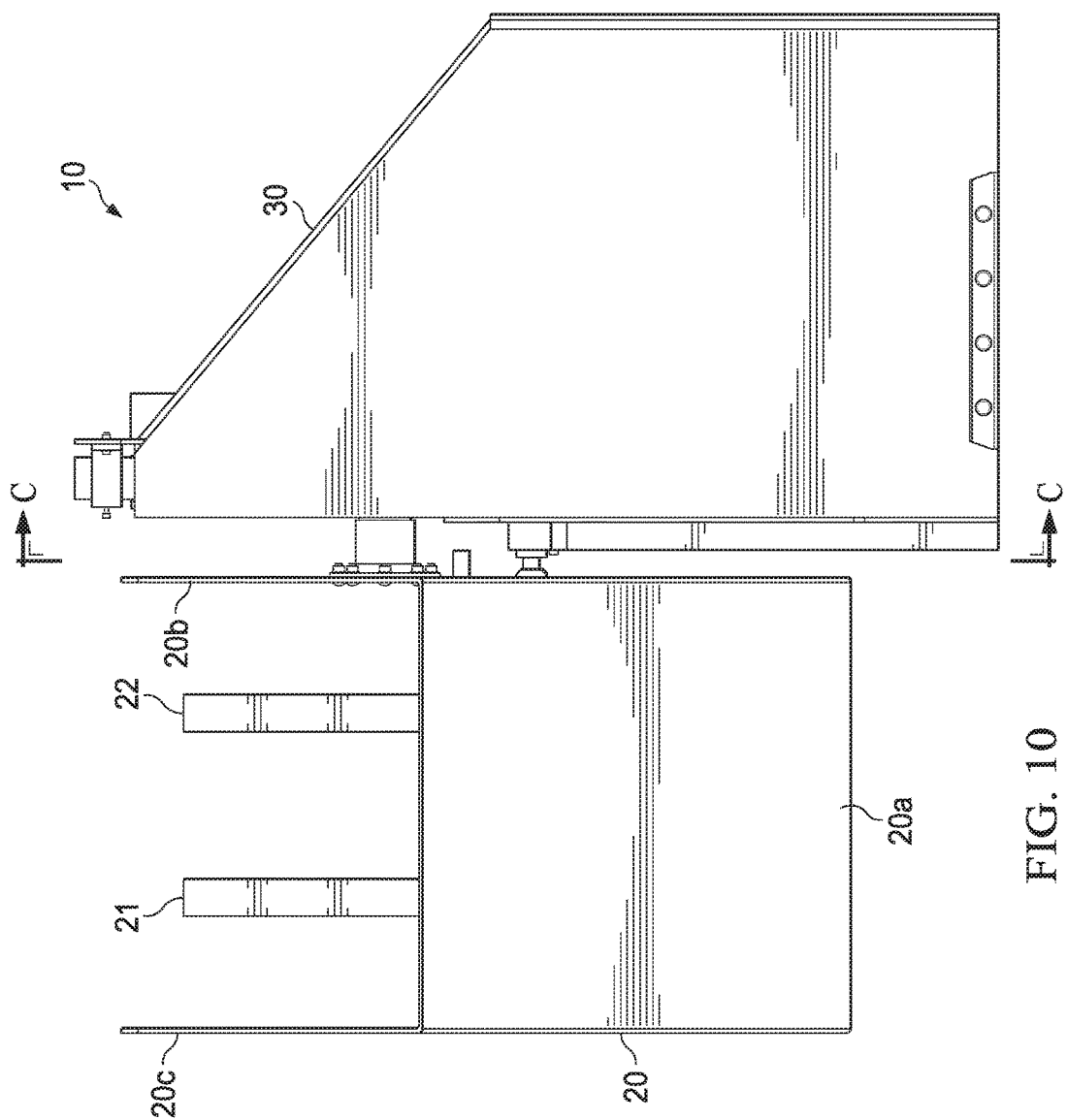
FIG. 10 is a side elevation view of the dumping system of FIG. 1, which corresponds to the fully extended position of the carriage shown in FIG. 8.
Figure 11:
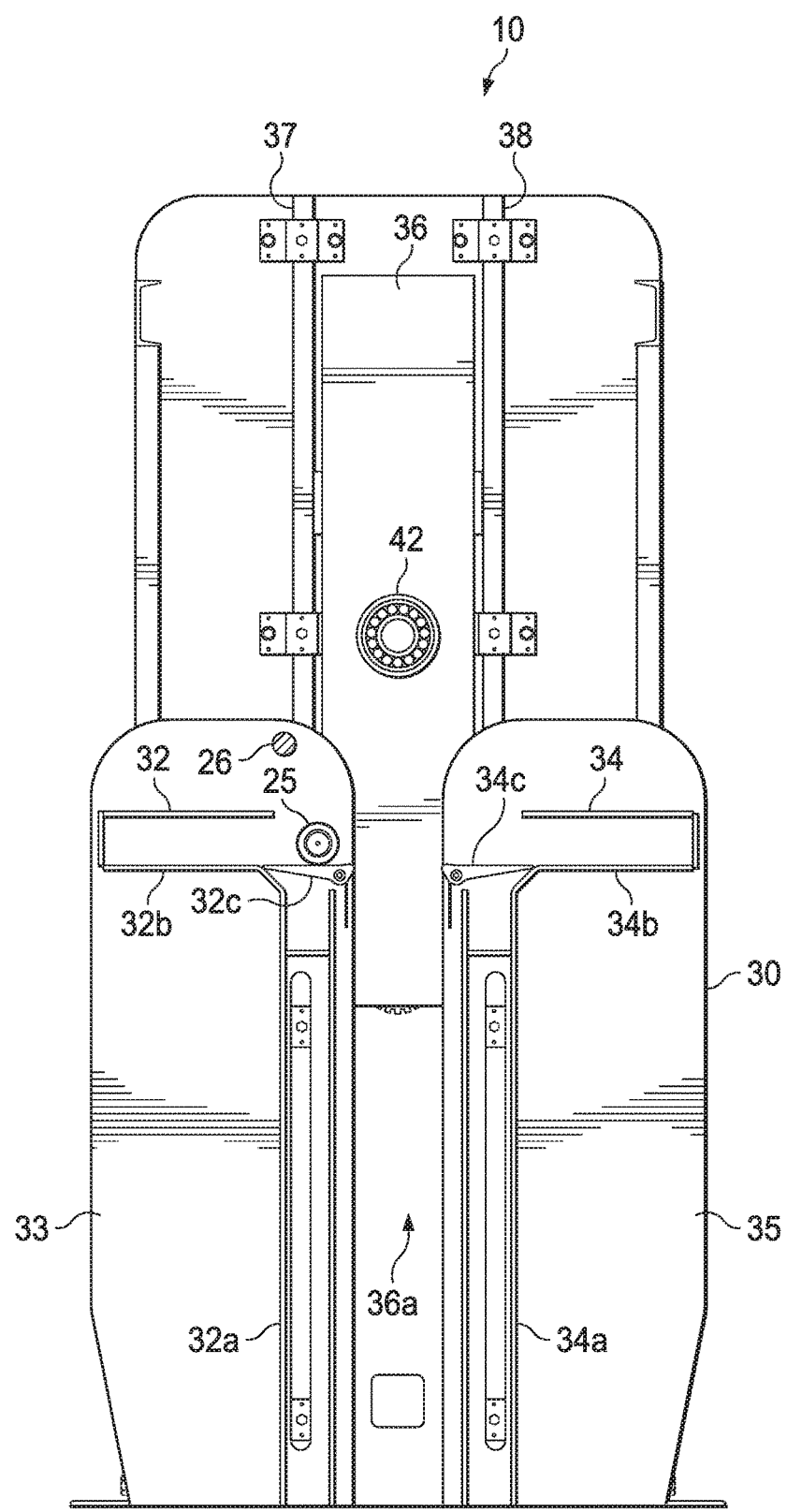
FIG. 11 is a first cross-sectional view taken along line C-C of FIG. 10.
Figure 12:
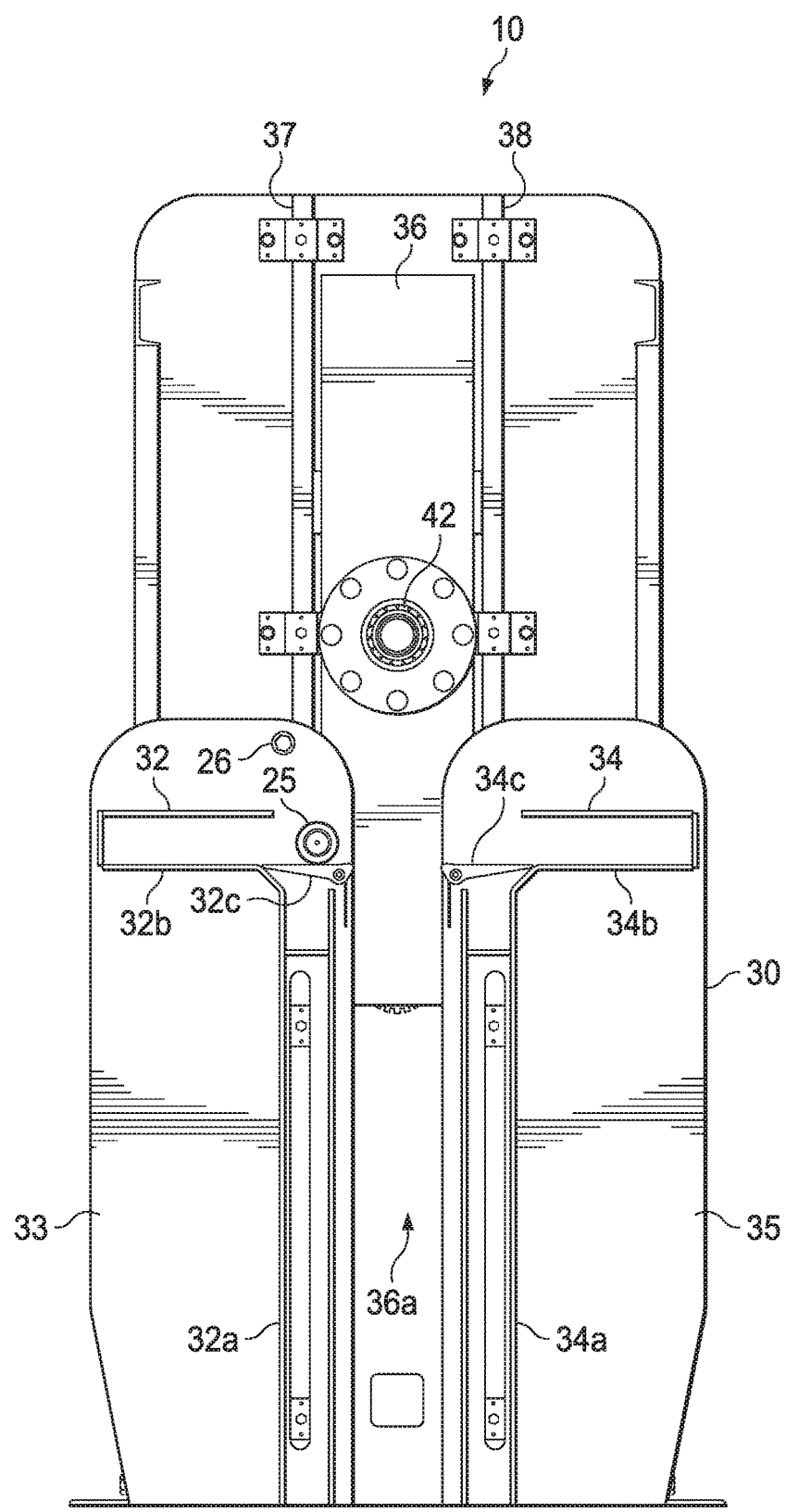
FIG. 12 is a second cross-sectional view that is similar to FIG. 11, which primarily shows an exemplary embodiment of a base structure of the dumping system of FIG. 1 (with a main body of the carriage hidden from view for clarity).
Figure 13:
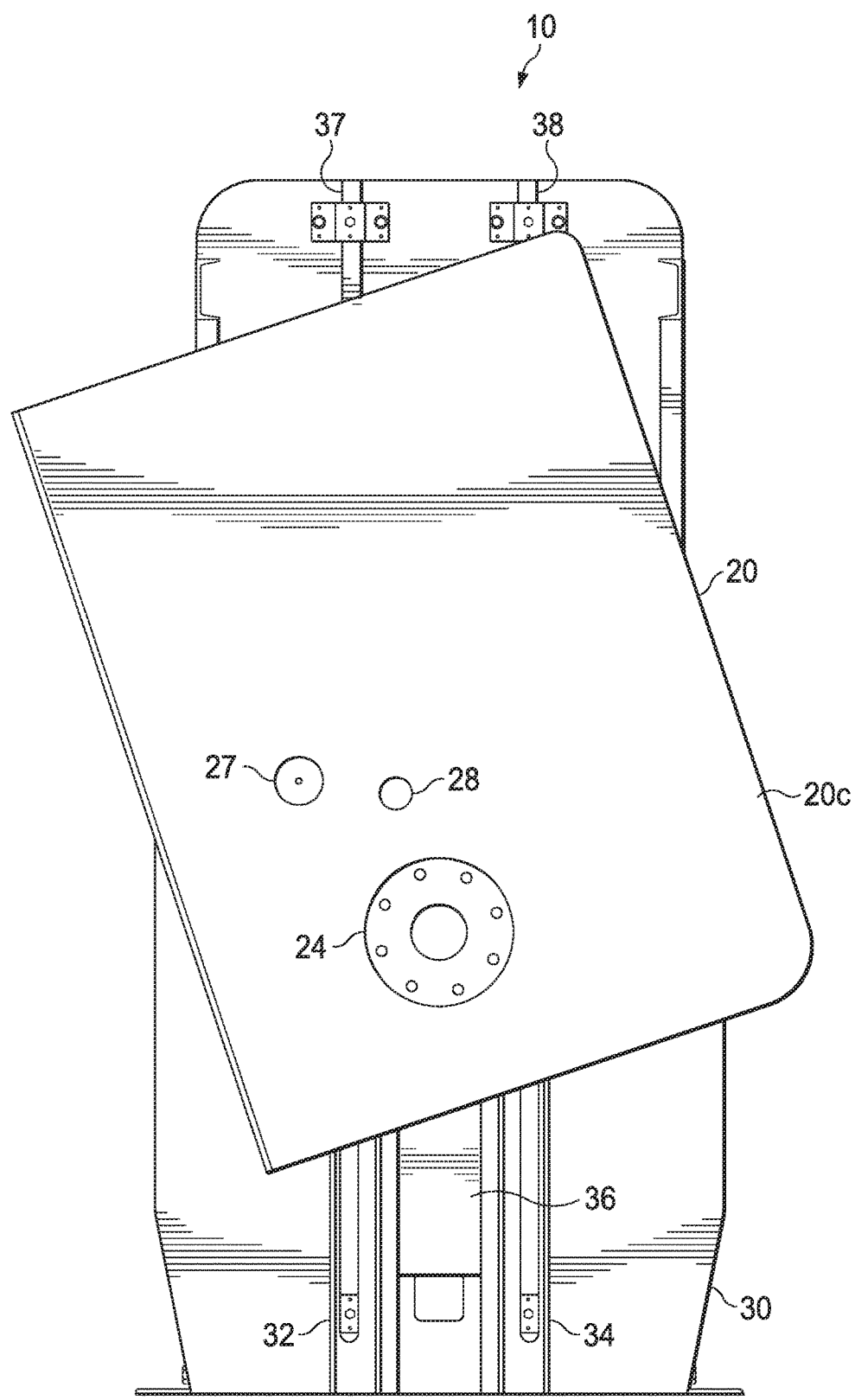
FIG. 13 is a front elevation view of the dumping system of FIG. 1, which shows the carriage in a partially retracted position.
Figure 14:
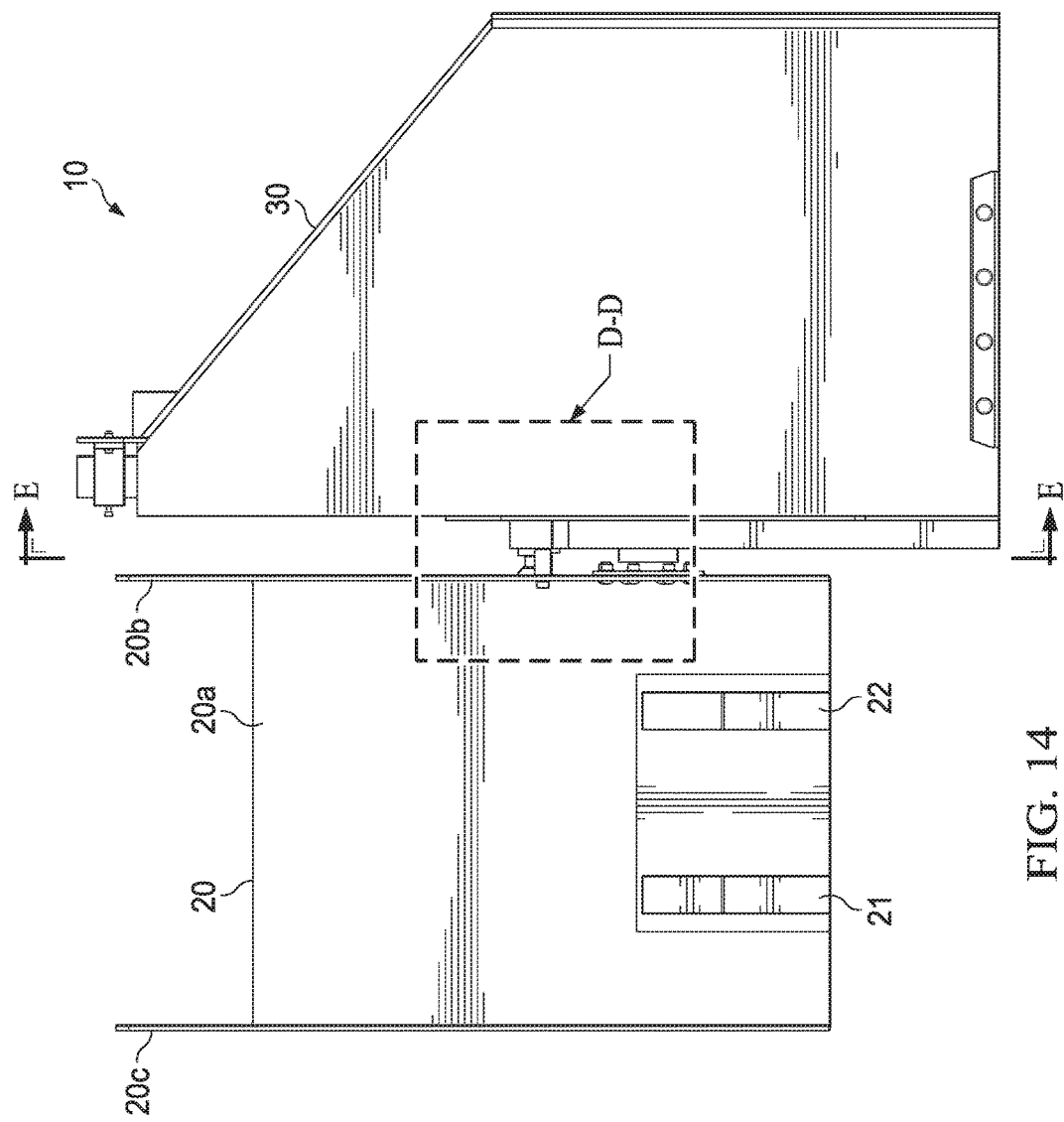
FIG. 14 is a side elevation view of the dumping system of FIG. 1, which corresponds to the partially retracted position of the carriage shown in FIG. 13.
Figure 15:
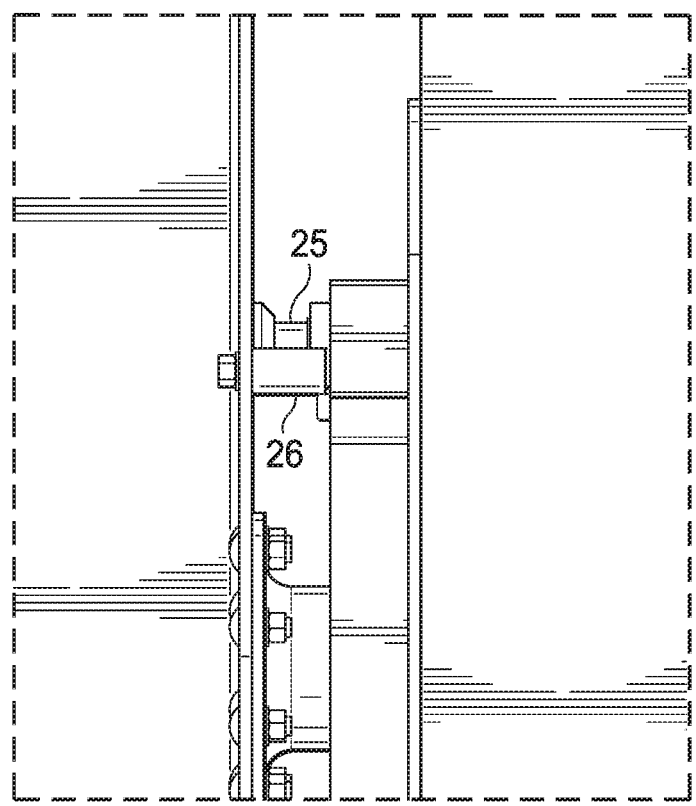
FIG. 15 is a detail view taken along line D-D of FIG. 14.
Figure 16:
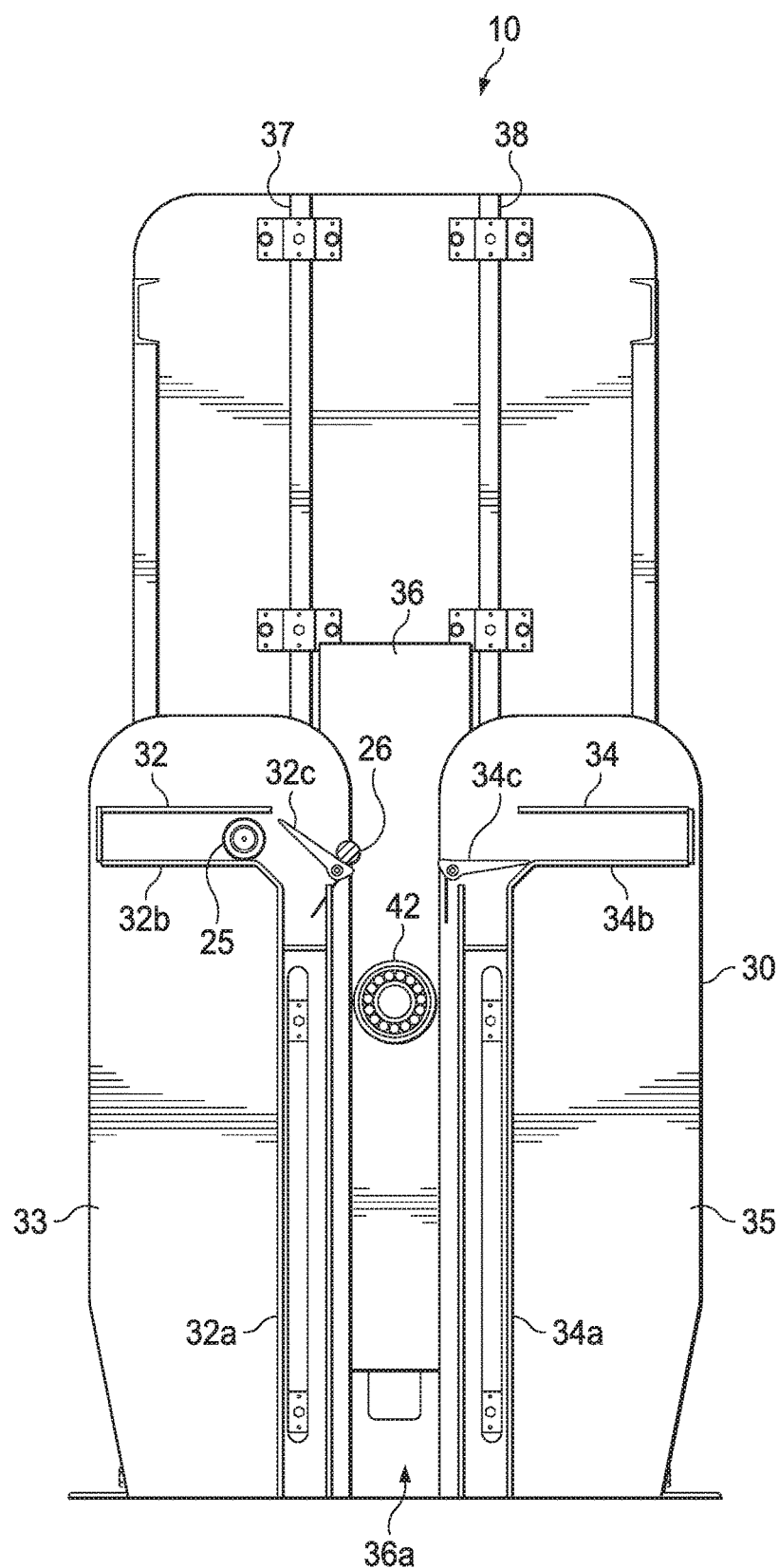
FIG. 16 is a first cross-sectional view taken along line E-E of FIG. 14.
Figure 17:
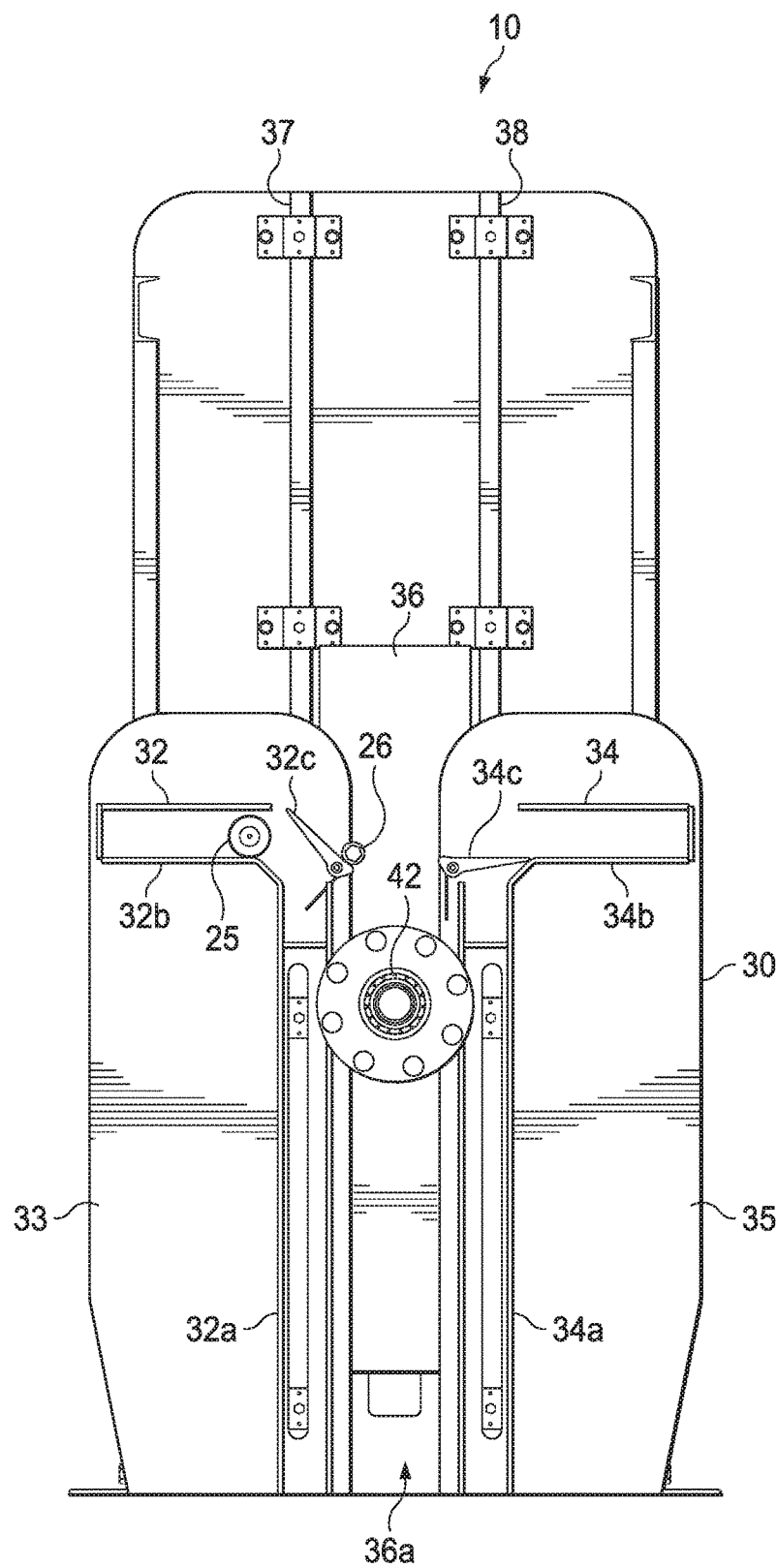
FIG. 17 is a second cross-sectional view that is similar to FIG. 16, which primarily shows an exemplary embodiment of a base structure of the dumping system of FIG. 1 (with a main body of the carriage hidden from view for clarity).

FIGS. 1-25 document exemplary movements of carriage 20. FIGS. 1-4 show system 10 when carriage 20 is in a fully retracted position to facilitate loading. Such as can be seen in FIG. 4, a flipper 32c of guide rail 32 is initially biased in a closed position. Similarly, a flipper 34c of guide rail 34 is also initially biased in a closed position. FIGS. 5-7 next show system 10 when carriage 20 is in a partially extended position as it would prepare to dump material. As shown in FIG. 7, cam follower 25 has forced flipper 32c to an open position. At the same time, flipper 32c forces cam follower 25 onto substantially horizontal portion 32b of guide rail 32 as the bearing guide plate 36 continues to be raised. FIGS. 8-12 next show system 10 when carriage 20 is in a fully extended position to dump material. FIGS. 11 and 12 show that flipper 32c has returned to a closed position after cam follower 25 was forced onto the substantially horizontal portion 32b of guard rail 32 on the way to the fully extended position. After dumping material, bearing guide plate 36 starts to go back down, which initially forces cam follower 25 back out onto substantially horizontal portion 32b. FIG. 13-17 next show system 10 when carriage 20 is in a partially retracted position. At this stage, as can be seen in FIGS. 16 and 17, toggle bar 26 causes flipper 32c to open. As bearing guide plate 36 continues downward, cam follower 25 returns to substantially vertical portion 32a of guide rail 32. The system 10 then returns to the fully retracted position shown in FIGS. 1-4. The process may then be repeated as needed for additional loads.

Figure 18:
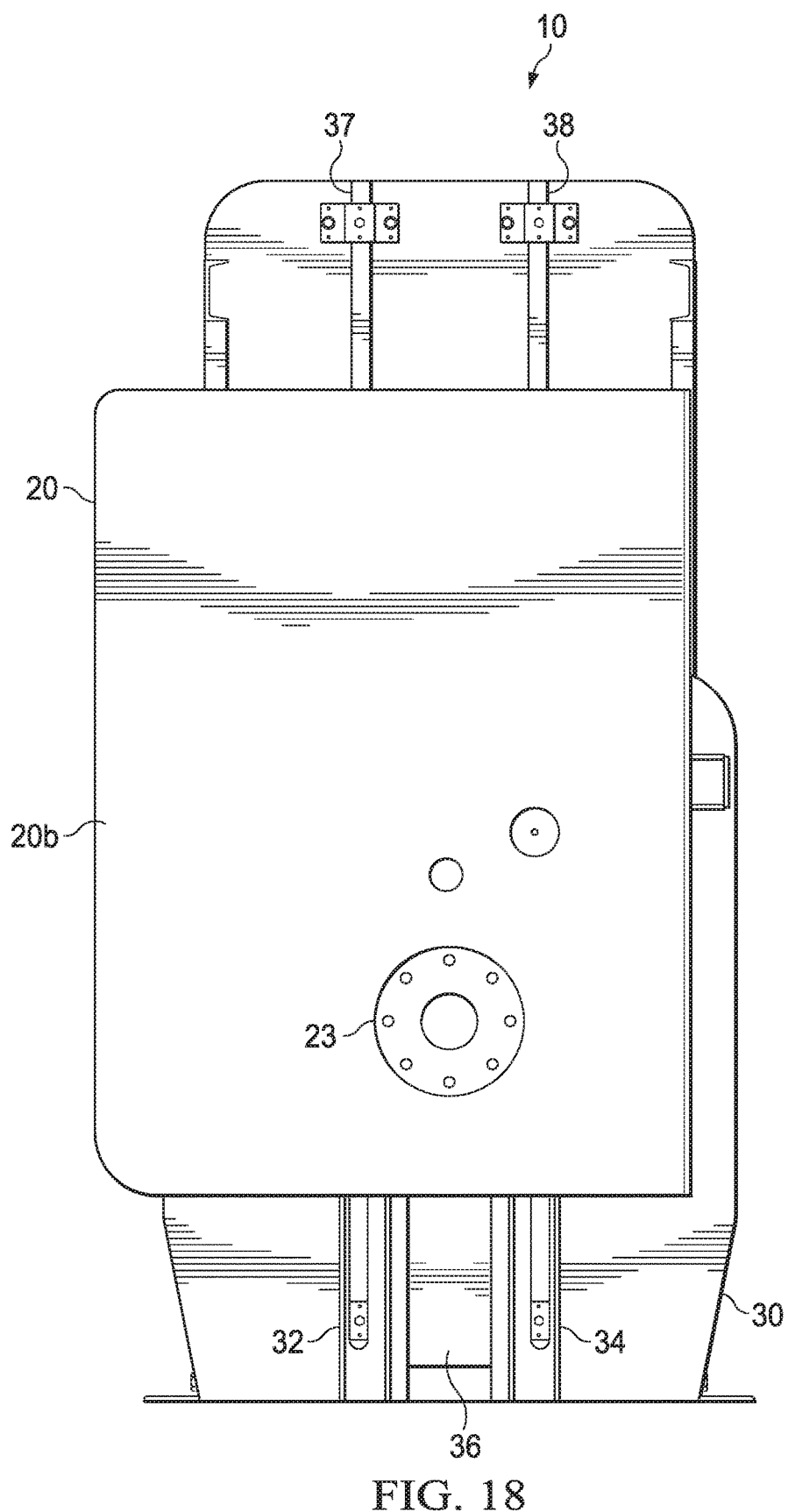
FIG. 18 is a front elevation view of the dumping system of FIG. 1, which shows the carriage in a fully retracted position, wherein the dumping system has been reconfigured such that the carriage is now adapted to operate in association with a left side of the base structure (when looking from the base structure toward the carriage) in order to dump material.
Figure 19:
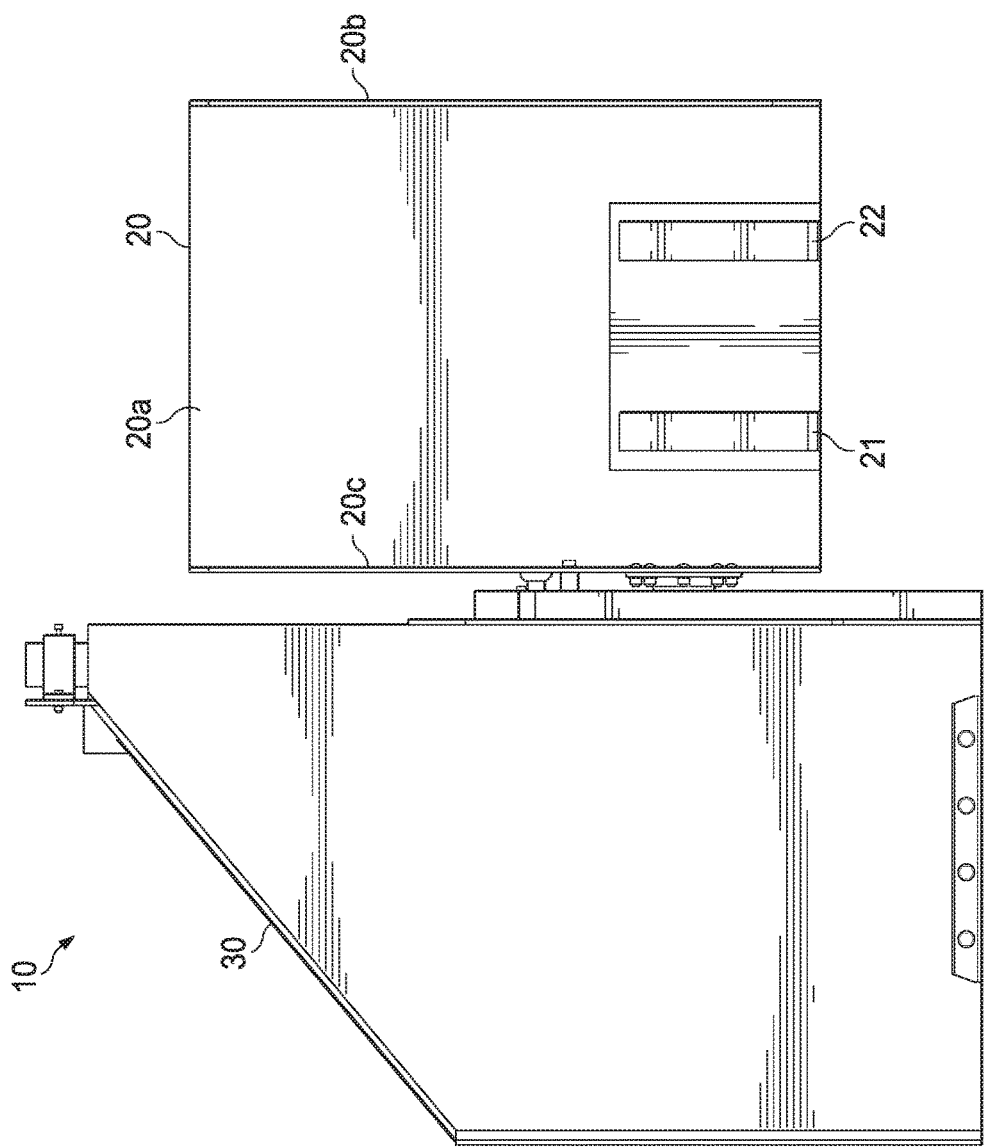
FIG. 19 is a side elevation view of the dumping system of FIG. 18, which corresponds to the fully retracted position of the carriage shown in FIG. 18.
Figure 20:
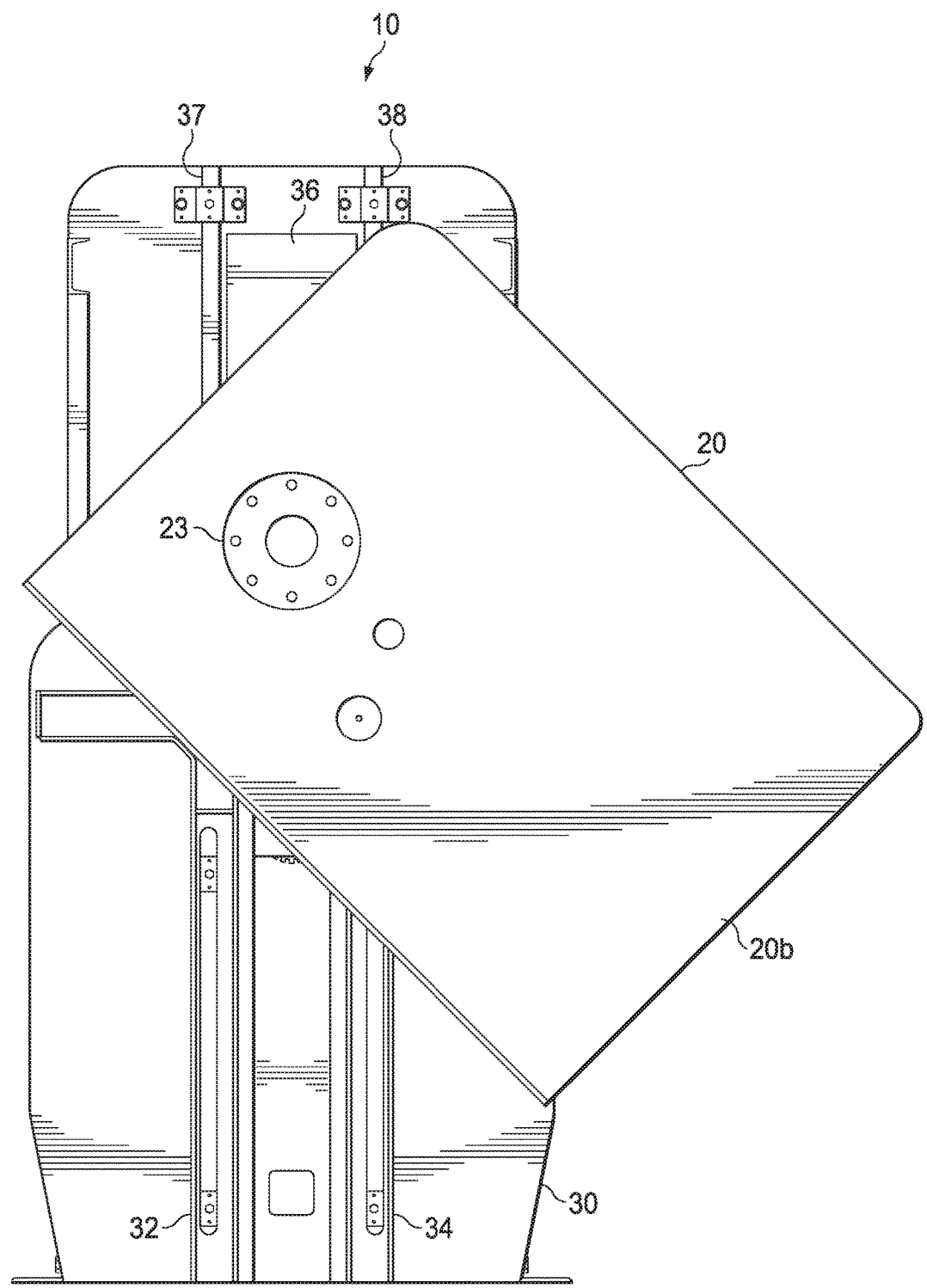
FIG. 20 is a front elevation view of the dumping system of FIG. 18, which shows the carriage in a fully extended position.
Figure 21:
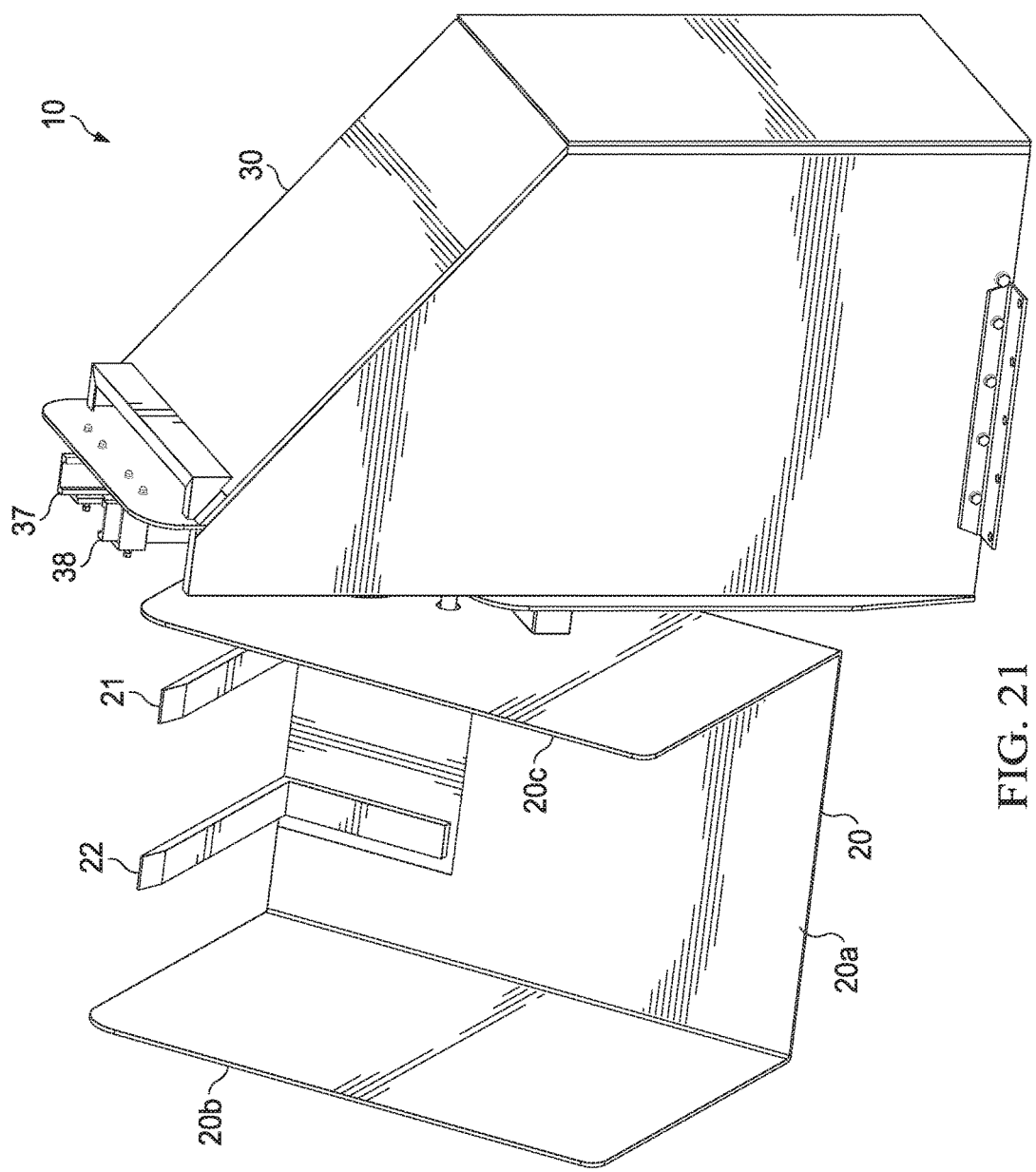
FIG. 21 is a perspective view of the dumping system of FIG. 18, which corresponds to the fully extended position of the carriage shown in FIG. 20.
Figure 22:
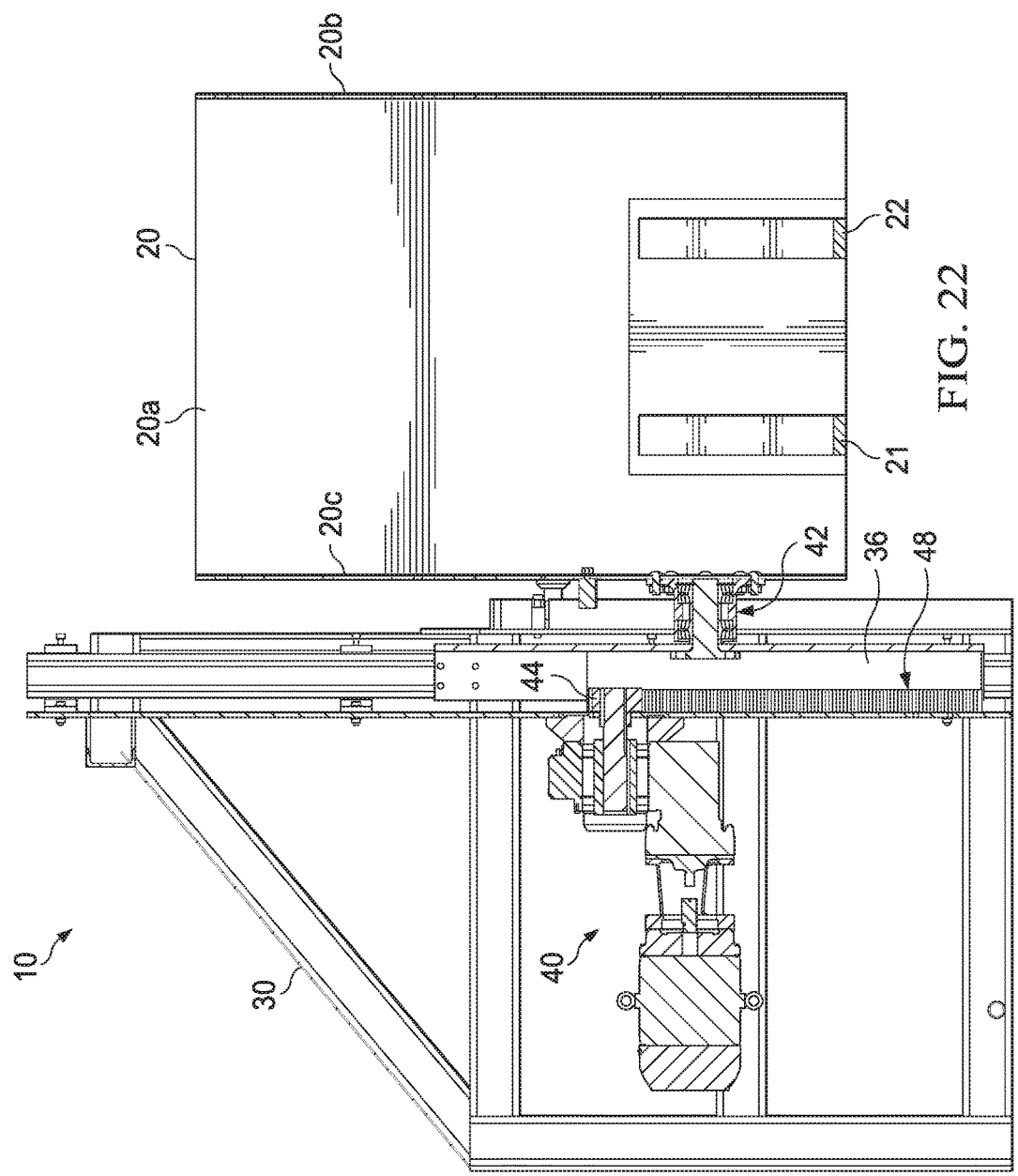
FIG. 22 is a cross-sectional view of the dumping system of FIG. 18, which shows an exemplary embodiment of a rack and pinion drive system that is adapted to facilitate the movement of the carriage.
Figure 23:
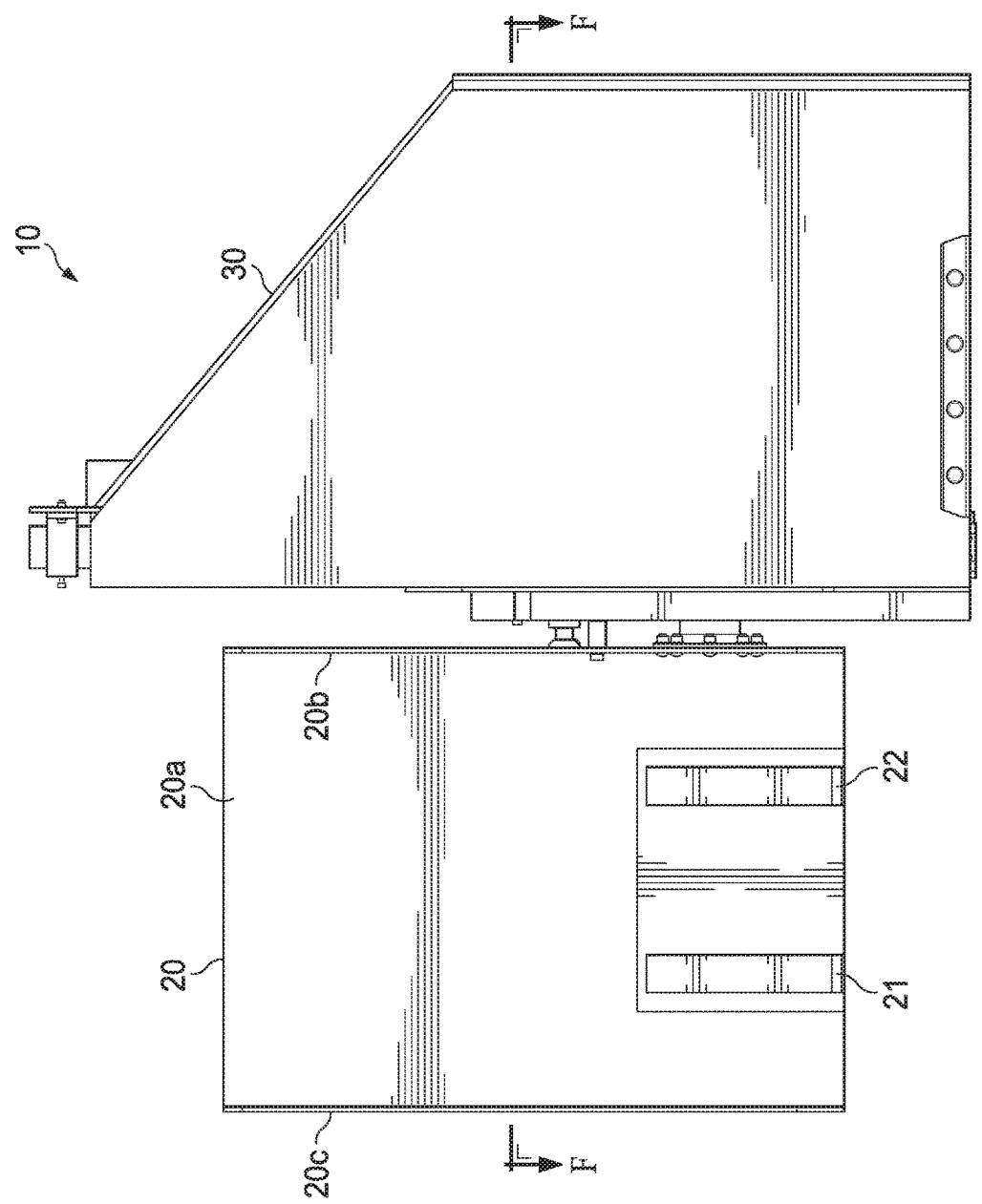
FIG. 23 (which is similar to FIG. 3) is a second side elevation view of the dumping system of FIG. 1, which corresponds to the fully retracted position of the carriage shown in FIG. 1.
Figure 24:
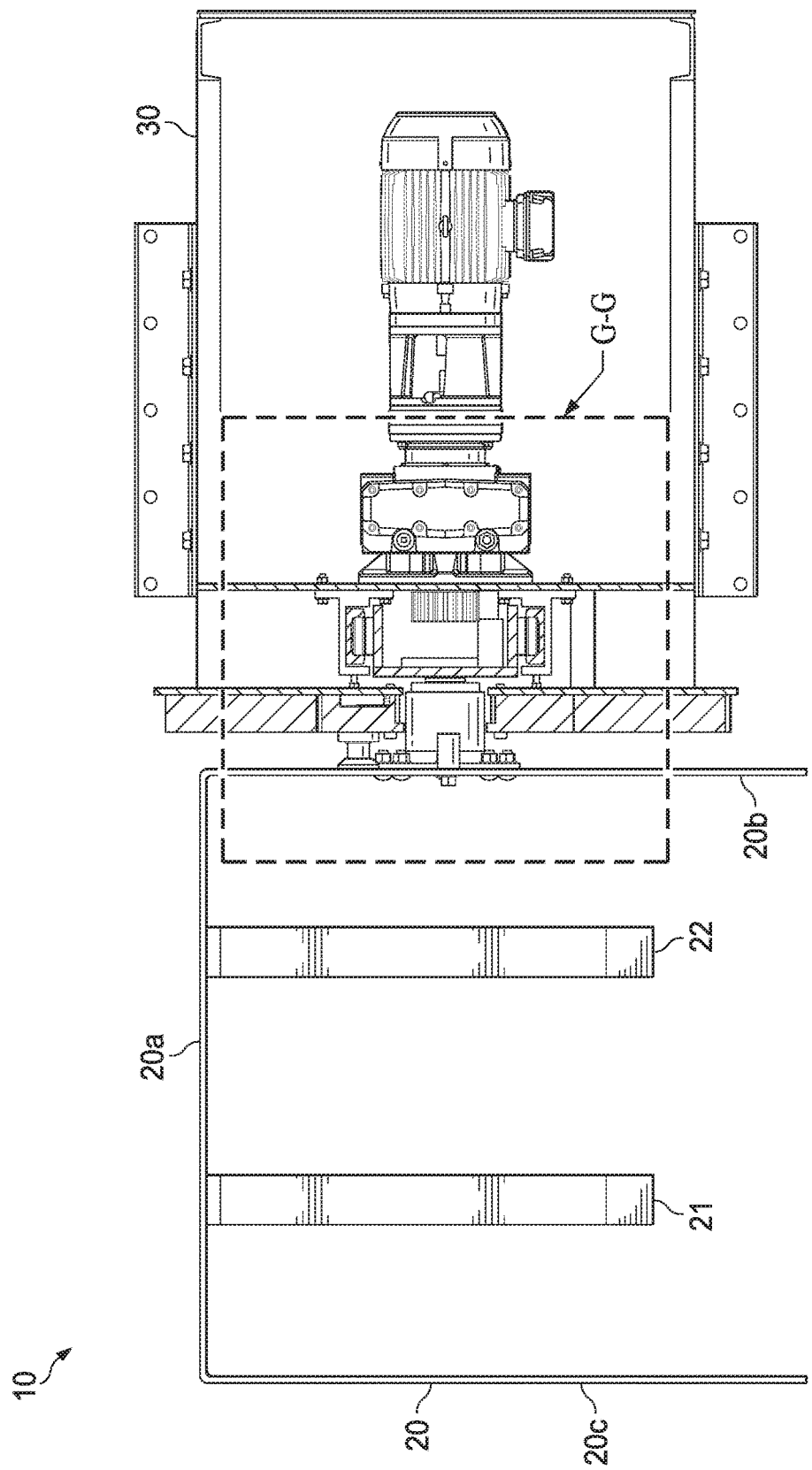
FIG. 24 is a cross-sectional view taken along line F-F of FIG. 23, which provides another view of the rack and pinion drive system of FIG. 22.
Figure 25:
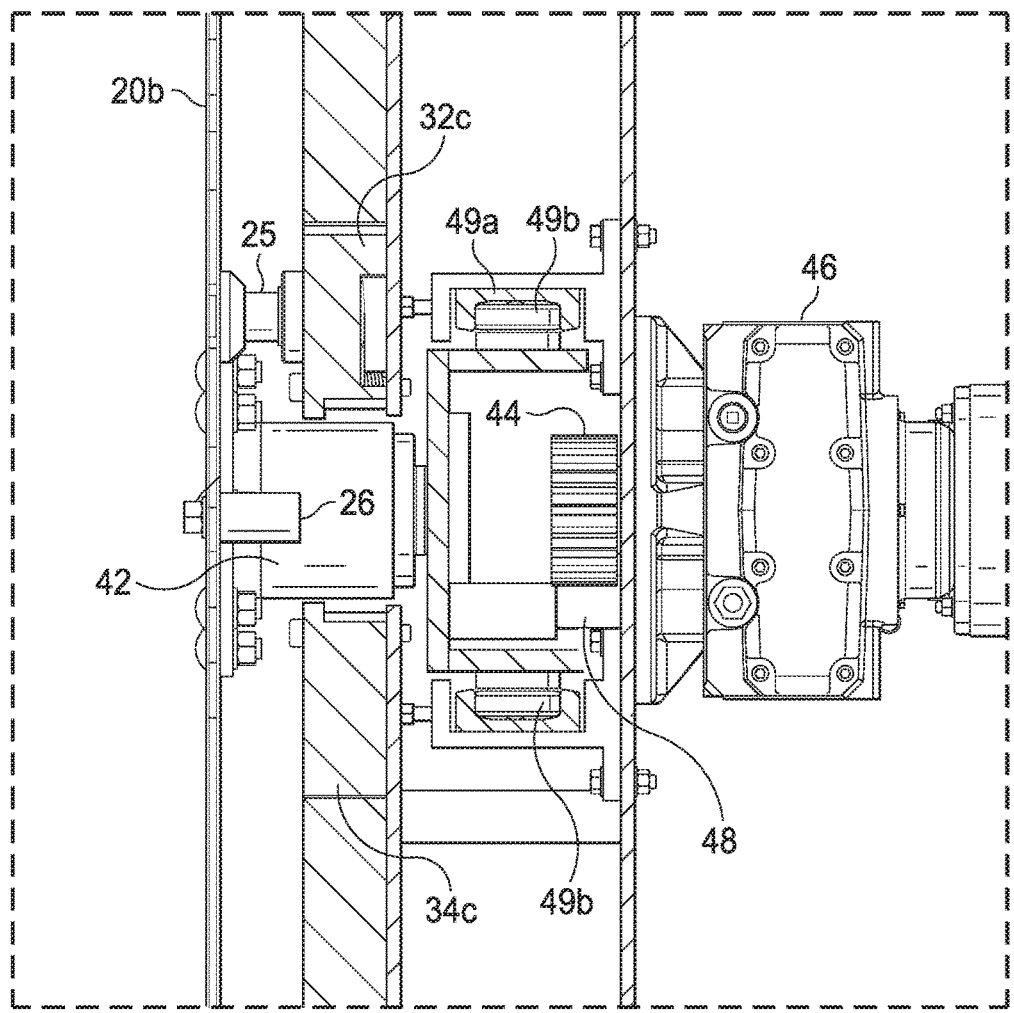
FIG. 25 is a detail view taken along line G-G of FIG. 24.
Figure 26:
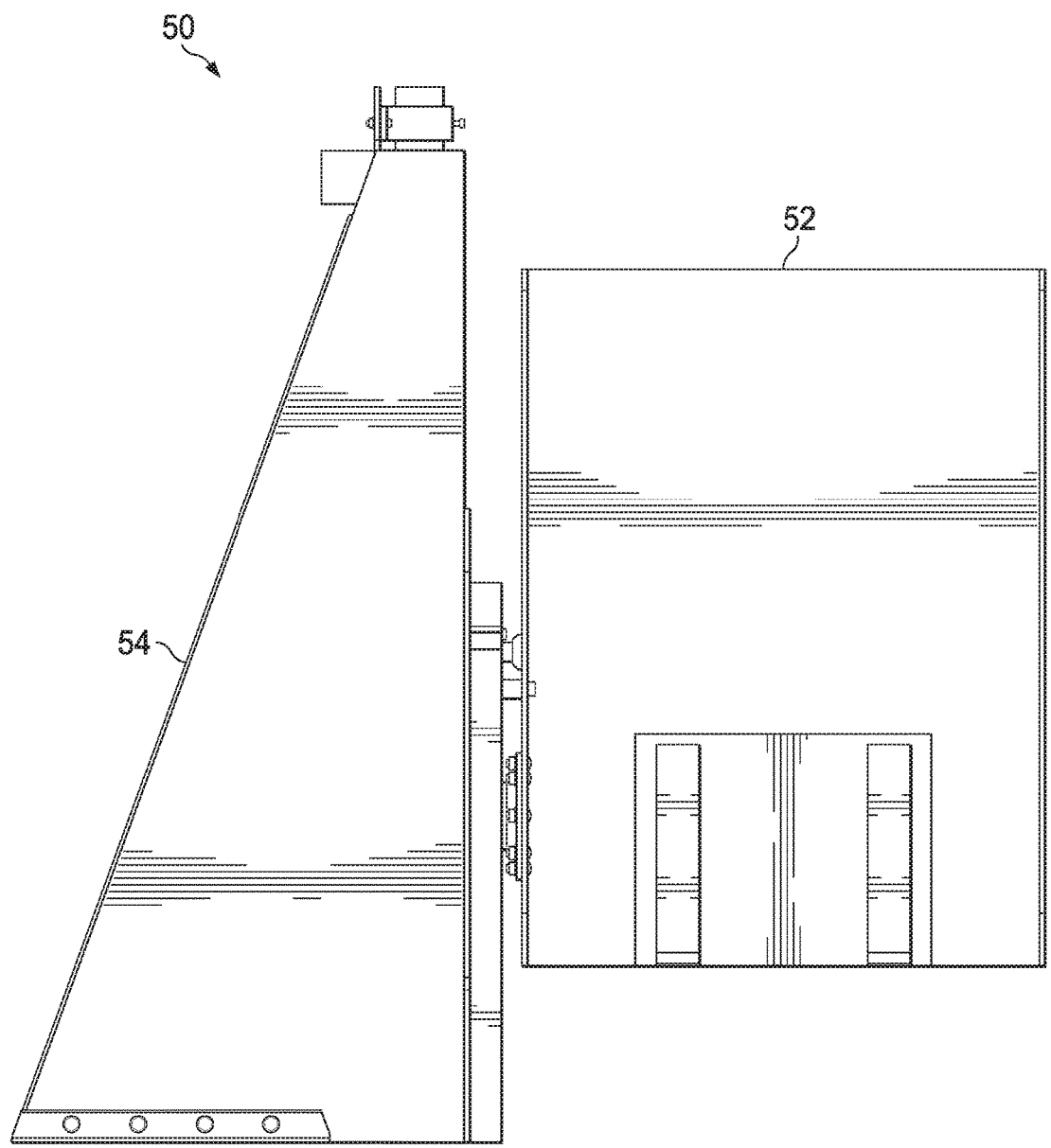
FIG. 26 is a side elevation view of another exemplary embodiment of a dumping system of the present invention, which shows an exemplary embodiment of a carriage in a fully retracted position, wherein the carriage is adapted to operate in association with a left side of an exemplary embodiment of a base structure (when looking from the base structure toward the carriage) in order to dump material.
Figure 27:
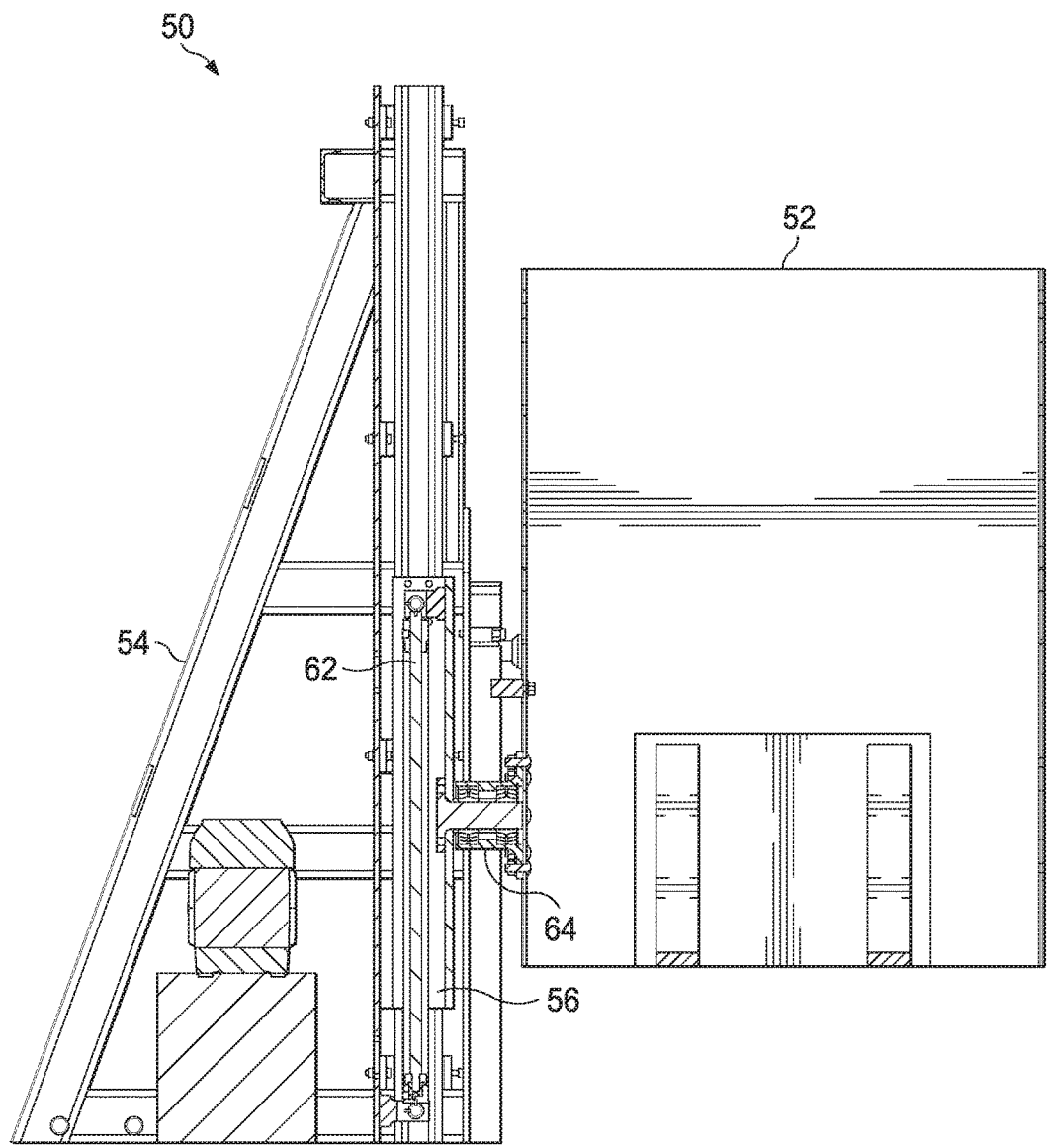
FIG. 27 is a cross-sectional view of the dumping system of FIG. 26, which shows an exemplary embodiment of a hydraulic drive system that is adapted to facilitate the movement of the carriage.
Figure 28:
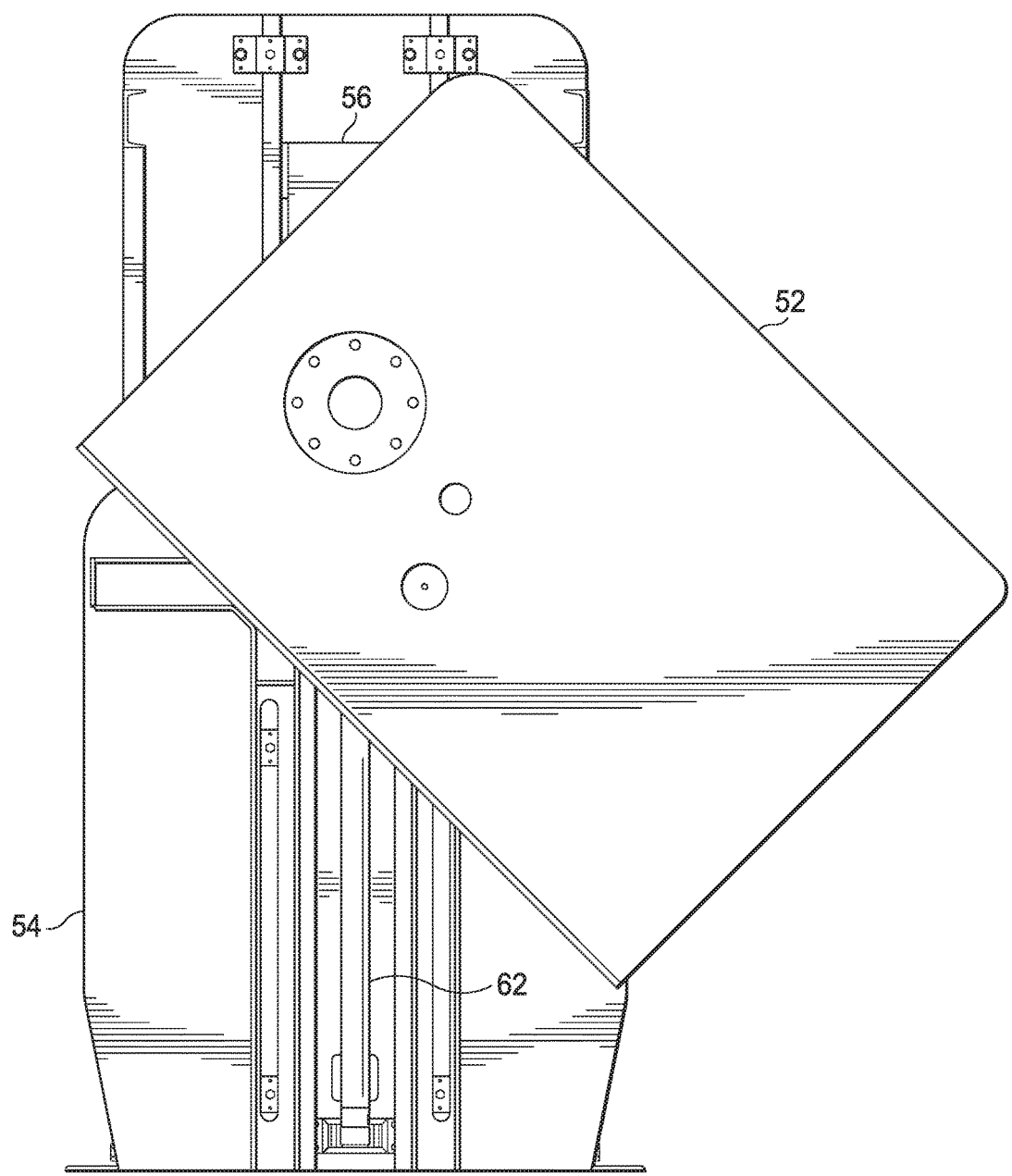
FIG. 28 is a front elevation view of the dumping system of FIG. 26, which shows the carriage in a fully extended position.
Figure 29:
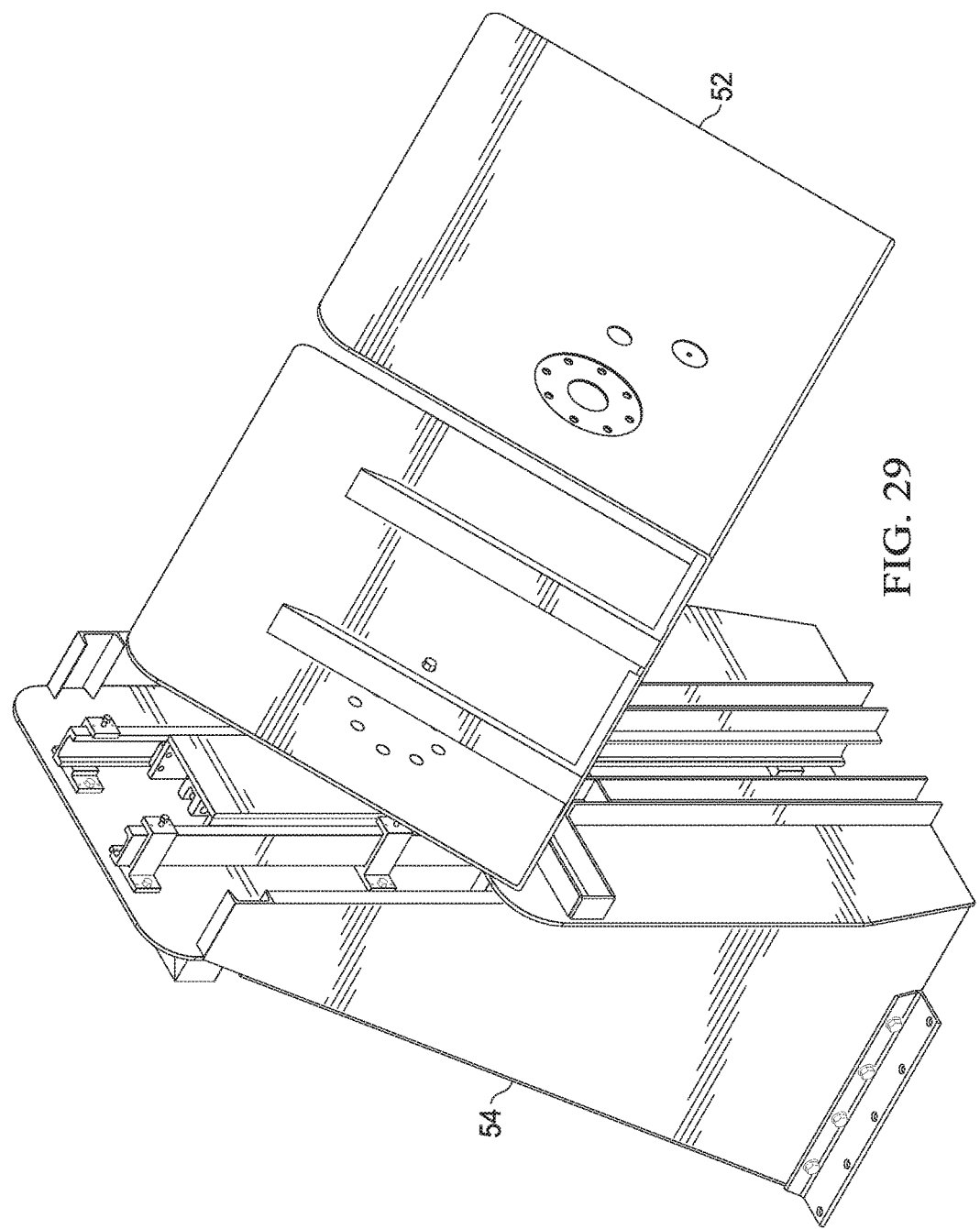
FIG. 29 is a perspective view of the dumping system of FIG. 26, which corresponds to the fully extended position of the carriage shown in FIG. 28.
Figure 30:
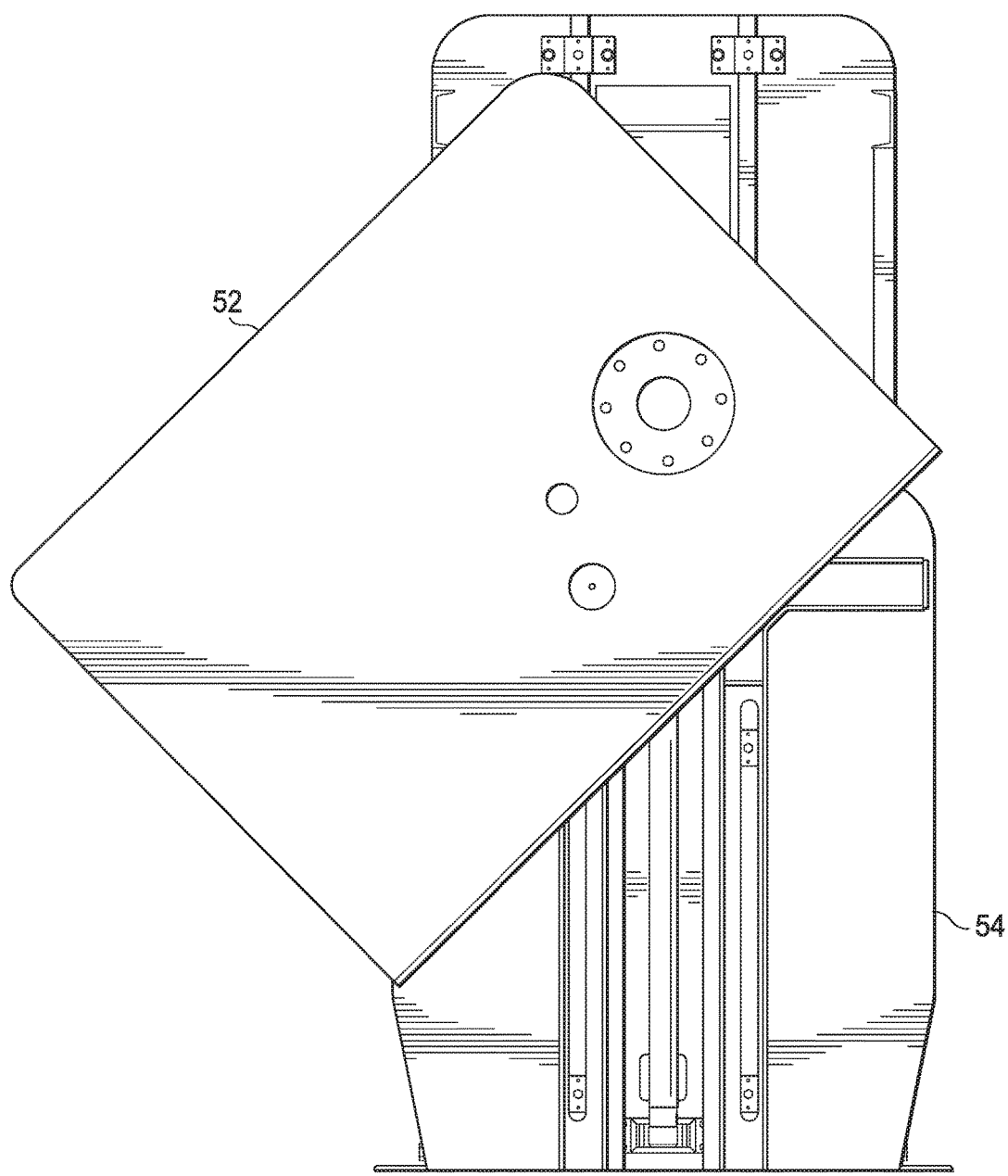
FIG. 30 is a front elevation view of the dumping system of FIG. 26, which shows the carriage in a fully extended position, wherein the dumping system has been reconfigured such that the carriage is now adapted to operate in association with a right side of the base structure (when looking from the base structure toward the carriage) in order to dump material.

FIGS. 18 and 19 show another configuration of system 10. In this configuration, bearing assembly 42 is mounted or otherwise engaged with carriage 20 at mounting location 24. Carriage 20 may now travel along guide rail 34. The movement may be similar to the aforementioned movement along guide rail 32. However, in this configuration, carriage 20 is adapted to rotate in an opposite direction via drive system 40 and bearing assembly 42. FIGS. 18 and 19 show carriage 20 in a fully retracted position for loading, whereas FIGS. 20 and 21 show carriage 20 in a fully extended position for dumping material.

Any suitable drive system may be utilized. The example of FIGS. 1-25 utilizes a rack and pinion drive system 40. FIGS. 22-25 provide various views of rack and pinion drive system 40. Rack and pinion drive system 40 comprises a pinion 44 that is engaged with a gear motor 46, and a rack 48 that is attached or otherwise connected to bearing guide plate 36. This example of rack and pinion drive system 40 further comprises a roller track 49a and roller guide 49b.

In FIGS. 26-31, the exemplary embodiment of system 50 utilizes a hydraulic drive system 60. Other than hydraulic drive system 60, system 50 may be similar to system 10. In this example, system 50 comprises a carriage 52, a base structure 54, and a bearing guide plate 56. Hydraulic drive system 60 comprises a hydraulic cylinder 62 that is engaged or associated with bearing guide plate 56. Hydraulic drive system 60 further comprises a bearing assembly 64 that is mounted or otherwise engaged with carriage 52. Other suitable drive systems may also be utilized (e.g., batteries).

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the invention. It is the intention, therefore, to limit the invention only as indicated by the scope of the claims.

What is claimed is:

1. A dumping system comprising:
   a base structure; and
   a dumping mechanism comprising a plurality of sides such that said dumping mechanism is adapted to receive and subsequently dump material, said plurality of sides comprising a plurality of sidewalls that include at least a first sidewall and a second sidewall, said first sidewall adapted to be connected to said base structure in a first configuration such that said dumping mechanism is adapted to rotate relative to said base structure between a first loading position and a first dumping position, said dumping mechanism further adapted to be repositioned relative to said base structure to be in a second configuration wherein said second sidewall is adapted to be connected to said base structure such that said dumping mechanism is adapted to rotate relative to said base structure between a second loading position and a second dumping position;
   wherein, relative to said base structure, said first loading position is different from said second loading position, and said first dumping position is different from said second dumping position.

2. The dumping system of claim 1 wherein said dumping mechanism is cantilevered to said base structure.

3. The dumping system of claim 1 wherein said base structure is a support frame.

4. The dumping system of claim 1 wherein said dumping mechanism is a carriage.

5. The dumping system of claim 4 wherein said plurality of sides of said carriage comprises at least one prong that extends from at least one of said sidewalls to facilitate reception of material to be dumped.

6. The dumping system of claim 5 wherein:
   three said sidewalls including said first sidewall and said second sidewall are arranged in a U-shape; and
   two said prongs extend from one of said sidewalls to facilitate reception of material to be dumped.

7. The dumping system of claim 1 wherein said base structure comprises a drive system that is adapted to facilitate rotation of said dumping mechanism in said first configuration and said second configuration.

8. The dumping system of claim 7 wherein said drive system is a rack and pinion drive system.

9. The dumping system of claim 7 wherein said drive system is a hydraulic drive system.

10. The dumping system of claim 7 wherein said dumping mechanism is cantilevered to a bearing assembly of said drive system.

11. The dumping system of claim 10 wherein said base structure comprises a bearing guide plate such that said bearing assembly extends through said bearing guide plate to connect to said dumping mechanism.

12. The dumping system of claim 10 wherein said drive system is adapted to raise and lower said bearing guide plate to cause said dumping mechanism to move between said first loading position and said first dumping position and between said second loading position and said second dumping position.

13. The dumping system of claim 12 wherein said base structure comprises at least one rail along which said bearing guide plate is adapted to move in a vertical direction to cause said dumping mechanism to move between said first loading position and said first dumping position or between said second loading position and said second dumping position.

14. The dumping system of claim 13 wherein:
   said base structure comprises a first guide rail and a second guide rail;
   said dumping mechanism is adapted to travel along said first guide rail in said first configuration; and
   said dumping mechanism is adapted to travel along said second guide rail in said second configuration.

15. The dumping system of claim 14 wherein:
   said first guide rail has an L-shape; and
   said second guide rail has an L-shape.

16. The dumping system of claim 1 wherein:
   said base structure comprises a first guide rail and a second guide rail;
   said dumping mechanism is adapted to travel along said first guide rail in said first configuration; and
   said dumping mechanism is adapted to travel along said second guide in said second configuration.

17. The dumping system of claim 16 wherein:
   said dumping mechanism comprises at least one cam follower;
   said at least one cam follower adapted to travel along said first guide rail in said first configuration; and
   said at least one cam follower adapted to travel along said second guide rail in said second configuration.

18. The dumping system of claim 16 wherein:
said first guide rail has an L-shape; and
said second guide rail has an L-shape.

19. The dumping system of claim 18 wherein:
said dumping mechanism comprises at least one cam follower;
said at least one cam follower adapted to travel along said first guide rail in said first configuration; and
said at least one cam follower adapted to travel along said second guide rail in said second configuration.

20. The dumping system of claim 19 wherein said dumping mechanism further comprises at least one toggle bar to facilitate travel along said first guide rail and said second guide rail.

\* \* \* \* \*